United States Patent [19]
Yoshihara et al.

[11] Patent Number: 6,031,632
[45] Date of Patent: *Feb. 29, 2000

[54] IMAGE RETRIEVAL APPARATUS CAPABLE OF PRINTING A MARK SHEET FOR RETRIEVAL

[75] Inventors: Kunio Yoshihara, Sagamihara; Hiroshi Sumio, Tokyo; Masanori Sakai, Yokohama; Hidenori Ozaki, Kawasaki; Ken Kuroda; Takehito Utsunomiya, both of Yokohama; Hiroyuki Yaguchi; Michiko Hirayu, both of Kawasaki, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/796,494

[22] Filed: Feb. 5, 1997

Related U.S. Application Data

[63] Continuation of application No. 08/355,519, Dec. 14, 1994, abandoned.

[30] Foreign Application Priority Data

Dec. 16, 1993 [JP] Japan .................. 5-343642

[51] Int. Cl.[7] .............. H04N 1/00; H04N 1/393
[52] U.S. Cl. .............. 358/403; 358/451; 382/298; 382/306
[58] Field of Search .............. 358/400, 401, 358/403, 468, 451; 283/70; 382/298, 305, 306

[56] References Cited

U.S. PATENT DOCUMENTS

| | | | |
|---|---|---|---|
| 4,893,194 | 1/1990 | Sakata | 358/451 |
| 4,933,733 | 6/1990 | Shiota et al. | 358/302 |
| 5,060,980 | 10/1991 | Johnson et al. | 283/70 |
| 5,144,452 | 9/1992 | Abuyama | 358/451 |
| 5,383,029 | 1/1995 | Kojima | 358/403 |

*Primary Examiner*—Thomas D. Lee
*Attorney, Agent, or Firm*—Fitzpatrick, Cella, Harper & Scinto

[57] ABSTRACT

In an image retrieval apparatus, a desired image is recorded on a storage medium so as to correspond to an index image, and a recorded image is retrieved using an index image selected by the user. When recording an image on a storage medium or when retrieving an image from a storage medium, an index image can be assigned using a mark sheet on which a plurality of index images are printed. The image retrieval apparatus prints a mark sheet having a format corresponding to the number and the size of index images input by the user.

30 Claims, 18 Drawing Sheets

IMAGE RETRIEVAL APPARATUS CAPABLE OF PRINTING A MARK SHEET FOR RETRIEVAL

This application is a continuation of application Ser. No. 08/355,519 filed Dec. 14, 1994, now abandoned.

BACKGROUND OF THE INVENTION

1. Field of the Invention

This invention relates to an image retrieval apparatus capable of printing a mark sheet for retrieval.

2. Description of the Related Art

Recently, there are an increasing number of offices that use document filing apparatuses, in which in order to preserve and retrieve a large amount of documents, documents are read and preserved on an magneto-optical disk or the like. In most of such document filing apparatuses, for example, an index representing the contents of the document information is added to the document information, and the corresponding document is retrieved using the index.

In order to facilitate assignment of an index when preserving/retrieving document information, document filing apparatuses have been proposed, in which a mark sheet, for marking index information necessary when preserving/retrieving a document, is used.

Document filing apparatuses have also been proposed, in which, in order to easily recall the index in a retrieval operation, retrieval is performed using an index image representing the index. In some of these apparatuses, mark sheets are also used.

However, in a system in which index images are printed on at least one mark sheet and the user checks a mark for a desired index image, if the format of the mark sheet is fixed, some users may feel it is difficult to find a desired index image because too many index images are present on the format. Other users may feel that index images are too small and difficult to observe. Others may want to select an index image for retrieval on a single mark sheet.

The above-described problems arise because a mark sheet having a format desired by the user is absent.

SUMMARY OF THE INVENTION

It is an object of the present invention to provide an image retrieval apparatus which overcomes the above-described problems.

It is another object of the present invention to provide an image retrieval apparatus capable of printing a mark sheet in which indices for retrieval are arranged in a desired form.

According to one aspect, the present invention, which achieves these objectives, relates to an image recording apparatus, comprising input means for inputting information relating to a layout of a mark sheet, generation means for generating a format in accordance with information input from the input means, and image forming means for forming the format generated by the generation means on a sheet to form a mark sheet.

According to another aspect, the present invention relates to a mark-sheet recording method, comprising the steps of inputting information relating to a layout of a mark sheet, generating a format in accordance with the input information, and forming the generated format on a sheet to form a mark sheet.

The foregoing and other objects, advantages and features of the present invention will become more apparent from the following detailed description of the preferred embodiment taken in conjunction with the accompanying drawings.

DETAILED DESCRIPTION OF THE PREFERRED EMBODIMENT

Figure 1:
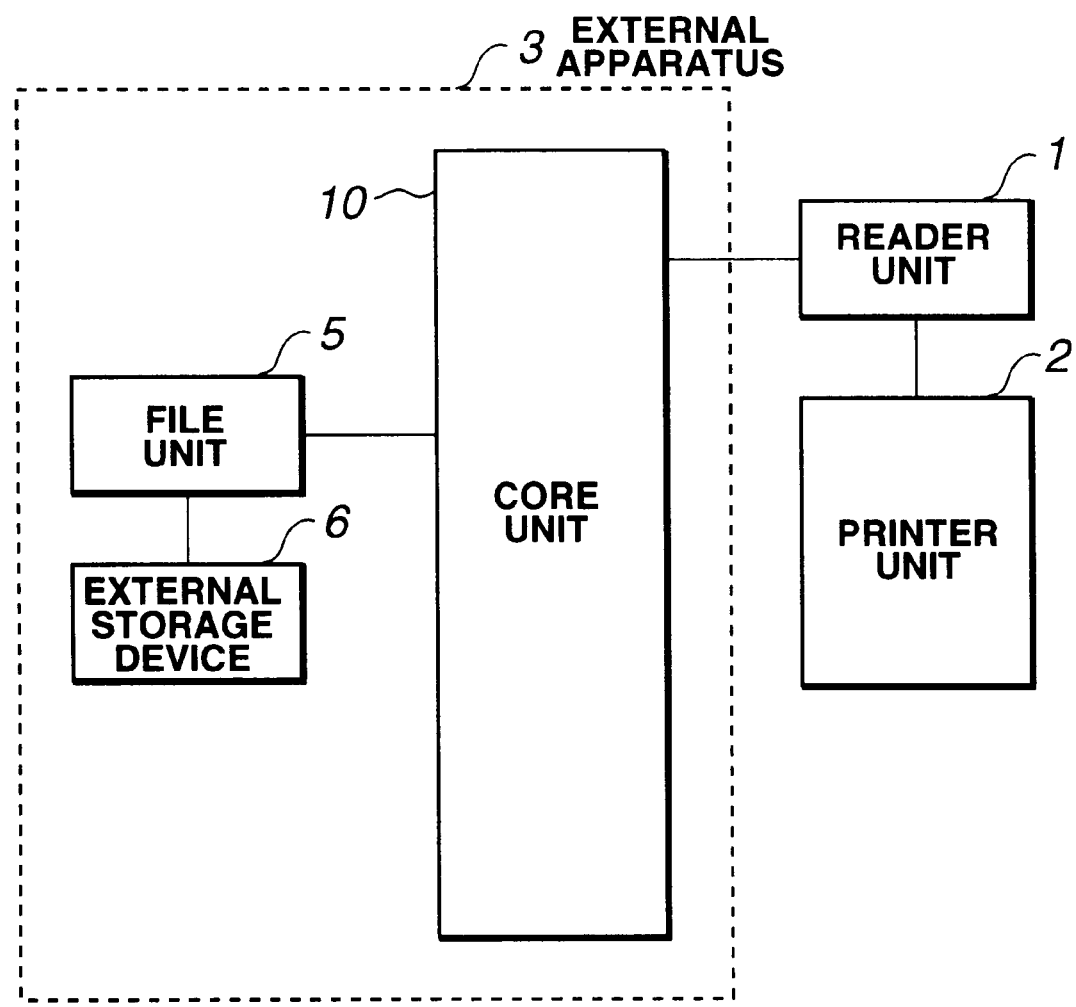
FIG. 1 is a block diagram illustrating an image retrieval apparatus according to an embodiment of the present invention.

FIG. 1 is a block diagram illustrating the configuration of a control system of an image storage/retrieval apparatus according to an embodiment of the present invention.

As shown in FIG. 1, the apparatus of the present embodiment includes an image input device (hereinafter termed a "reader unit") 1 for converting an original into image data, an image output device (hereinafter termed a "printer unit") 2, having a plurality of kinds of recording-paper cassettes, for outputting image data on a sheet of recording paper as a visual image in response to a printing command, and an external apparatus 3, having various kinds of functions, which is electrically connected to the reader unit 1.

The external apparatus 3 includes a file unit 5, an external storage device 6 connected to the file unit 5, and a core unit 10 for controlling the functions of these units. The functions of the respective units will now be described in detail.

Figure 2:
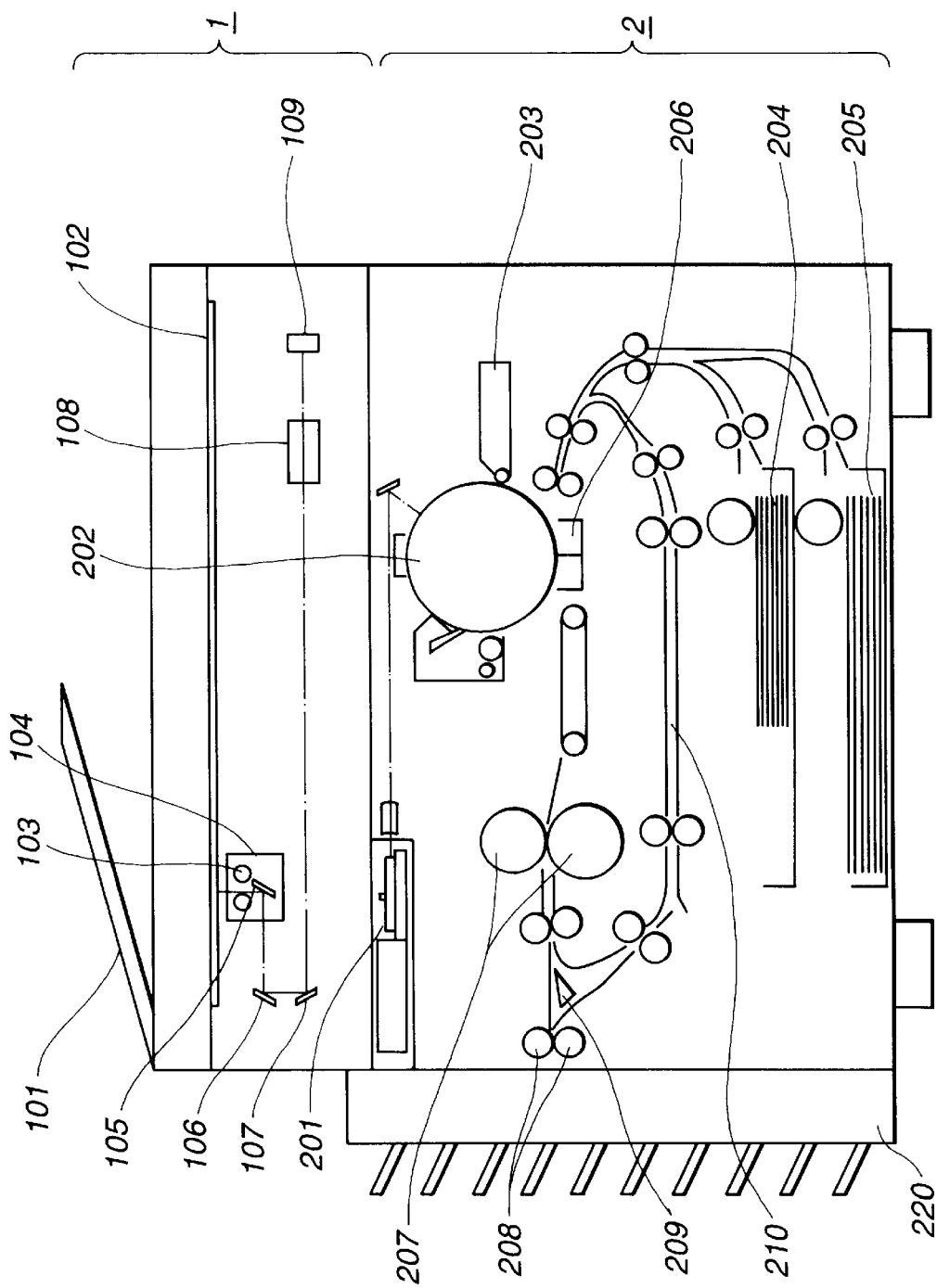
FIG. 2 is a block diagram illustrating a reader unit and a printer unit shown in FIG. 1.
Figure 3:
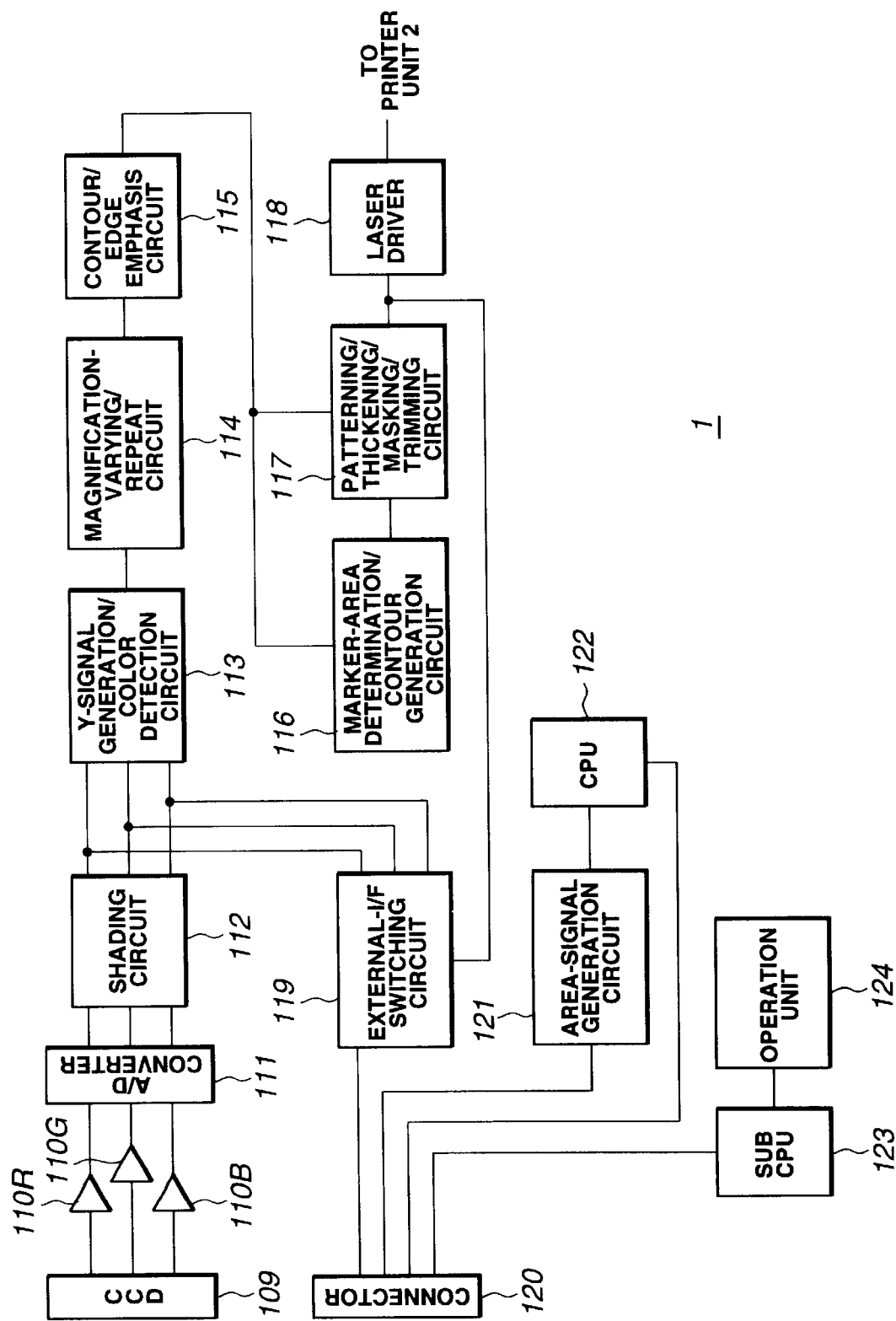
FIG. 3 is a block diagram illustrating an image processing unit of the reader unit.

FIG. 2 is a cross-sectional view illustrating the structure of the reader unit 1 and the printer unit 2 of the image storage/retrieval apparatus. FIG. 3 is a block diagram illustrating the configuration of the reader unit 1. First, the reader unit 1 will be described in detail with reference to FIGS. 2 and 3.

Originals mounted on a original-feeding device 101 are individually conveyed onto original-mount glass 102. When an original has been conveyed, a lamp 103 of a scanner unit 104 is lit and the scanner unit 104 moves to illuminate the original. Reflected light from the original passes through a lens 108 via mirrors 105, 106 and 107, and is then input to a CCD (charge-coupled device) image sensor (hereinafter termed a "CCD") 109.

Next, image processing within the reader unit 1 will be described in detail with reference to FIG. 3. First, image information input to the CCD 109 is subjected to photoelectric conversion, and is converted into an electrical signal. Color information from the CCD 109 is amplified by amplifiers 110R, 110G and 110B in the following stage so as to be adjusted to an input-signal level of an A/D (analog-to-digital) converter 111. Output signals from the A/D converter 111 are input to a shading circuit 112, where unevenness in the luminous-intensity distribution of the lamp of the scanner unit 103 and uneveness in the sensitivity of the CCD 109 are corrected. Signals from the shading circuit 112 are input to a Y-signal generation/color detection circuit 113 and to an external-I/F switching circuit 119.

The Y-signal generation/color detection circuit 113 obtains a Y signal by performing a calculation according to the following expression using the signals from the shading circuit 112:

$$Y = 0.3R + 0.6G + 0.1B.$$

The Y-signal generation/color detection circuit 113 also includes a color detection circuit for separating the R, G and B signals into seven colors and outputting signals for the respective colors. The output signal from the Y-signal generation/color detection circuit 113 is input to a magnification-varying/repeat circuit 114. Magnification-varying processing in the sub-scanning direction is performed by changing the scanning speed of the scanner unit 104, and magnification-varying processing in the main scanning direction is performed by the magnification-varying/repeat circuit 114. The magnification-varying/repeat circuit 114 can output the same image a plurality of times. A contour/edge emphasis circuit 115 obtains edge emphasis/contour information by emphasizing high-frequency components of the signal from the magnification/varying/repeat circuit 114. A signal from the contour/edge emphasis circuit 115 is input to a marker-area determination/contour generation circuit 116 and to a patterning/thickening/masking/trimming circuit 117.

The marker-area determination/contour generation circuit 116 generates contour information of a marker by reading a portion of the original written by a marker pen of an assigned color. The patterning/thickening/masking/trimming circuit 117 performs thickening, masking and trimming based on the contour information. Patterning is performed according to a color detection signal from the Y-signal generation/color detection circuit 113.

A signal output from the patterning/thickening/masking/trimming circuit 117 is input to a laser driver circuit 118, which converts the input signal subjected to various kinds of processing into a signal for driving a laser. The signal from the laser driver 118 is input to the printer unit 2, which forms a visual image.

Next, a description will be provided of the external I/F switching circuit 119, which serves as an interface with the external apparatus 3. When outputting image information from the reader unit 1 to the external apparatus 3, the external I/F switching circuit 119 outputs image information from the patterning/thickening/masking/trimming circuit 117 to a connector 120. The connector 120 connects the reader unit 1 to the external apparatus 3. When inputting image information from the external apparatus 3 to the reader unit 1, the external I/F switching circuit 119 inputs image information from the connector 120 to the Y-signal generation/color detection circuit 113.

The above-described image processing is performed in accordance with instructions from a CPU (central processing unit) 122. An area-signal generation circuit 121 generates various kinds of timing signals necessary for the above-described image processing in accordance with values set by the CPU 122. Communication with the external apparatus 3 is performed using a communication function incorporated in the CPU 122. A subCPU 123 controls an operation unit 124, and communicates with the external apparatus 3 using a communication function incorporated in the subCPU 123.

Next, a description will be provided of the printer unit 2.

The signal input to the printer unit 2 is converted into an optical signal by an exposure control unit 201, to illuminate a photosensitive member 202 in accordance with the image signal. A latent image formed on the photosensitive member 202 by the illuminating light is developed by a developing unit 203. A sheet of transfer paper is conveyed from a transfer-paper mounting unit 204 or 205 in synchronization with the timing of the development, and the developed image is transferred onto the sheet by a transfer unit 206. The transferred image is fixed on the sheet by a fixing unit 207, and the sheet is discharged outside the apparatus by a sheet-discharging unit 208. The sheet output from the sheet-discharging unit 208 is discharged onto a corresponding one of bins when a sorting function operates in a sorter 220, and is discharged onto the uppermost bin of the sorter 220 when the sorting function does not operate.

Next, a description will be provided of a method of outputting sequentially-read images onto the surfaces of a sheet of transfer paper. The sheet on which an image has been fixed by the fixing unit 207 is first conveyed to the sheet-discharging unit 208, and is then conveyed to a transfer-paper mounting unit 210 for feedback via a conveying-direction switching member 209 by inverting the feeding direction of the sheet. When the next original has been prepared, the image of the original is read in the above-described manner. Since the same sheet is fed again from the transfer-paper mounting unit 210 for feedback, two images can be output onto the two surfaces of the same sheet of transfer paper.

Next, a description will be provided of the external apparatus 3.

The external apparatus 3 is connected to the reader unit 1 by a cable. The core unit 10 within the external apparatus 3 controls signals and the functions of the respective units. The external apparatus 3 includes the file unit 5 for converting information of various kinds of originals into electrical signals and preserving the obtained signals, the external storage device 6, comprising a magneto-optical disk, connected to the file unit 5, for storing the information relating to the originals, and the core unit 10 for controlling the functions of the above-described units.

Figure 4:
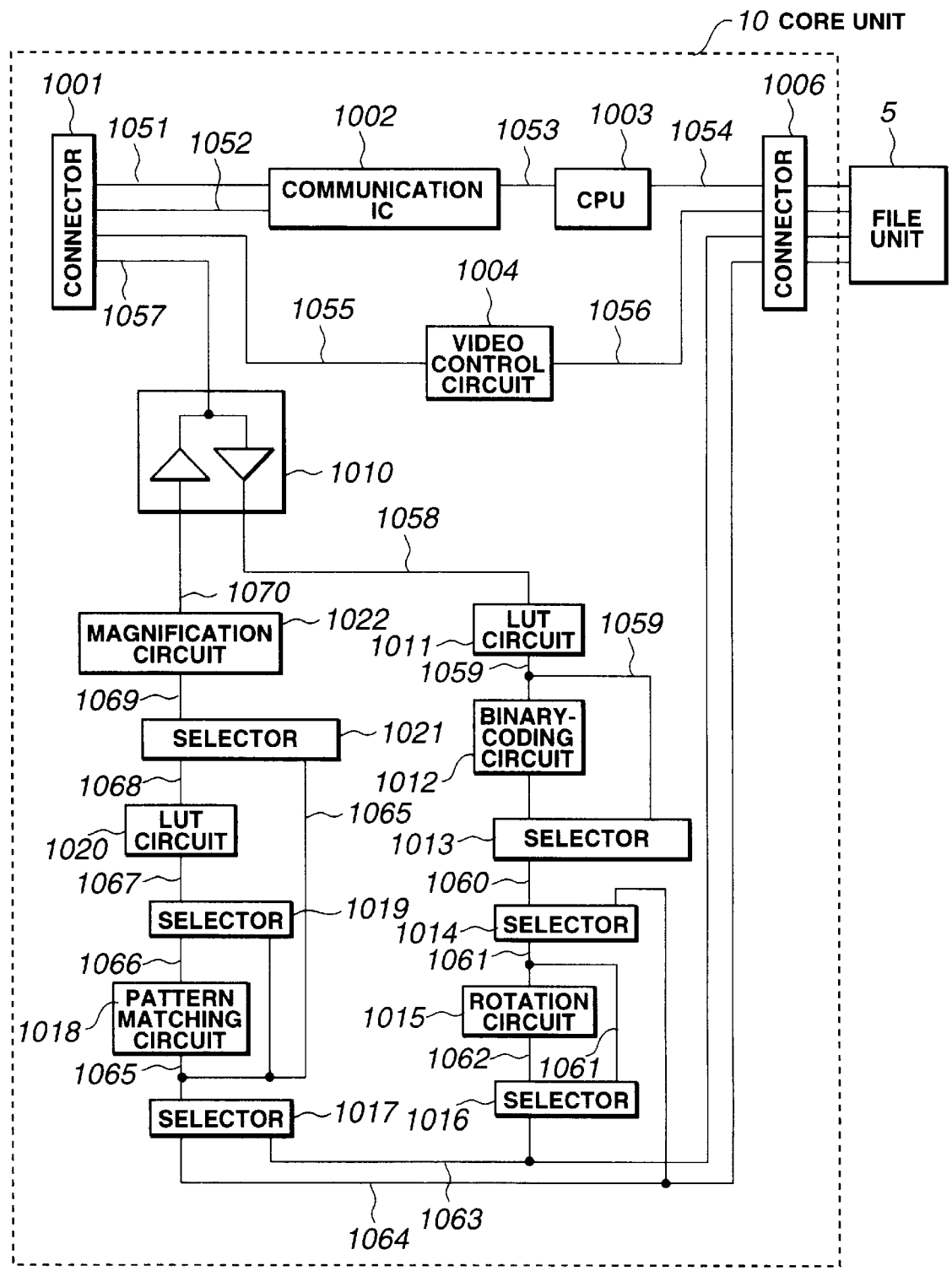
FIG. 4 is a block diagram illustrating a core unit shown in FIG. 1.

Next, a description will be provided of the core unit 10 with reference to FIG. 4. A connector 1001 of the core unit 10 is connected to the connector 120 of the reader unit 1 by a cable.

The connector 1001 includes the following four kinds of signal lines. A signal line 1057 transmits an 8-bit multivalue video signal. A signal line 1055 transmits a control signal for controlling the video signal. A signal line 1051 is used for communication with the CPU 122 within the reader unit 1. A signal line 1052 is used for communication with the subCPU 123 within the reader unit 1. Signals on the signal lines 1051 and 1052 are processed using a communication protocol by a communication IC (integrated circuit) 1002, and the obtained communication information is transmitted to a CPU 1003 via a CPU bus 1053.

The signal line 1057 is a bidirectional video-signal line, so that information from the reader unit 1 can be received by the core unit 10, and information from the core unit 10 can be output to the reader unit 1. The signal line 1057 is connected to a buffer 1010, where the bidirectional signal line is separated into unidirectional signal lines 1058 and 1070. The signal on the signal line 1058 is the 8-bit multivalue video signal from the reader unit 1, and is input to an LUT (look-up table) circuit 1011 of the following stage.

The LUT circuit 1011 converts the image information from the reader unit 1 into a desired value using a look-up table. A signal on a signal line 1059 from the LUT circuit 1011 is input to a binary-coding circuit 1012 or a selector 1013. The binary-coding circuit 1012 has a simple binary-coding function of binary-coding the multivalue signal on the signal line 1059 with a fixed slice level, a binary-coding function using a variable slice level in which the slice level changes depending on the values of pixels surrounding a target pixel, and a binary-coding function using an error diffusion method.

The binary-coded information input into the binary-coding circuit 1012 is converted into a multivalue signal by the binary-coding circuit 1012 having values 00H and FFH when the value of the information equals 0 and 1, respectively. The selector 1013 selects either the signal from the LUT circuit 1011 or the output signal from the binary-coding circuit 1012. The signal on a signal line 1060 from the selector 1013 is input to a selector 1014.

The selector 1014 selects one of an output video signal on a signal line 1064 input from the file unit 5 to the core unit 10 via a connector 1006, and the output signal of the selector 1013 on the signal line 1060 according to an instruction from the CPU 1003. A signal on a signal line 1061 output from the selector 1014 is input to a rotation circuit 1015 and a selector 1016.

The rotation circuit 1015 has a function of rotating the input image signal by +90 degrees, −90 degrees and +180 degrees. That is, the rotation circuit 1015 stores the information input from the reader unit 1 after the binary-coding circuit 1012 has converted the information into the binary-coded signal. The rotation circuit 1015 reads stored information, while rotating it, in response to an instruction from the CPU 1003.

A selector 1016 selects one of a signal on an output signal line 1062 of the rotation circuit 1015, and the signal on the input signal line 1061 of the rotation circuit 1015, and inputs the selected signal on a signal line 1063 to the connector 1006 for the file unit 5, and a selector 1017.

The signal line 1063 is an 8-bit synchronous unidirectional video bus for transferring image information from the core unit 10 to the file unit 5. The signal line 1064 is an 8-bit synchronous unidirectional video bus for transferring image information from the file unit 5. A video control circuit 1004 controls signals on the signal lines 1063 and 1064 using a signal output to a signal line 1056 connected to the connector 1006.

A signal line 1054 is also connected to the CPU 1003 and the connector 1006. The signal line 1054 is a 16-bit bidirectional CPU bus, and asynchronously exchanges data commands. Information can be transferred between the file unit 5 and the core unit 10 via the above-described two video buses 1063 and 1064 and the CPU bus 1054.

The signal on the signal line 1064 from the file unit 5 is input to the selectors 1014 and 1017. The selector 1014 inputs the signal on the signal line 1064 to the rotation circuit 1015 of the following stage in response to an instruction from the CPU 1003.

The selector 1017 selects one of the signal on the signal line 1063 and the signal on the signal line 1064 according to an instruction from the CPU 1003. A signal on a signal line 1065 of the selector 1017 is input to a pattern matching circuit 1018 and a selector 1019. The pattern matching circuit 1018 performs pattern matching of a pattern of the signal on the signal line 1065 with a predetermined pattern, and outputs a predetermined multivalue signal to a signal line 1066 when the two patterns coincide. When the two patterns do not coincide, the signal on the signal line 1065 is output to the signal line 1066.

The selector 1019 selects one of the signal on the signal line 1065 and the signal on the signal line 1066 according to an instruction from the CPU 1003. A signal on an output signal line 1067 of the selector 1019 is input to an LUT circuit 1020 of the following stage.

The LUT circuit 1020 changes the signal on the input signal line 1067 in accordance with characteristics of the printer unit 2 when outputting image information to the printer unit 2.

A selector 1021 selects one of a signal on a signal line 1068 of the LUT circuit 1020, and the signal on the signal line 1065 according to an instruction from the CPU 1003. An output signal from the selector 1021 on a signal line 1069 is input to a magnification circuit 1022 of the following stage.

The magnification circuit 1022 can independently set the values of magnification in the x direction and the y direction according to an instruction from the CPU 1003. Magnification is performed by linear interpolation. A signal on an output signal line 1070 of the magnification circuit 1022 is input to the buffer 1010.

The signal on the signal line 1070 input to the buffer 1010 becomes a signal on the bidirectional signal line 1057 according to an instruction from the CPU 1003, and is transmitted to the printer unit 2 via the connector 1001. An image is printed by the printer unit 2.

Next, a description will be provided of the operation of the core unit 10 according to information from the file unit 5.

When outputting information to the file unit 5, the CPU 1003 communicates with the CPU 122 of the reader unit 1 via the communication IC 1002, the connector 1001 and the connector 120, and outputs a command to scan the original. The reader unit 1 outputs image information to the connector 120 as a result of scanning of the original by the scanner unit 104 in response to the command. The reader unit 1 is connected to the external apparatus 3 by the cable, and the information from the reader unit 1 is input to the connector 1001 of the core unit 10.

The image information input to the connector 1001 becomes a signal on the unidirectional signal line 1058 after passing through the buffer 1010. The 8-bit multivalue signal on the signal line 1058 from the buffer 1010 is converted into a desired signal by the LUT circuit 1011.

For example, it is possible to skip the background of the original. When binary-coding the original, the signal on the output signal line 1059 of the LUT circuit 1011 is input to the binary-coding circuit 1012 of the following stage. The binary-coding circuit 1012 converts the input signal into an 8-bit multivalue signal having values 00H and FFH when the binary-coded signal equals 0 and 1, respectively. The output signal of the binary-coding circuit 1012 is input to the rotation circuit 1015 or the selector 1016 via the selectors 1013 and 1014. A signal on the output signal line 1062 of the rotation circuit 1015 is also input to the selector 1016. The selector 1016 selects one of the signal on the signal line 1061 and the signal on the signal line 1062. The selection of the signal is determined by the CPU 1003 after performing communication with the file unit 5 via the CPU bus 1054. The signal on the output signal line 1063 of the selector 1016 is transmitted to the file unit 5 via the connector 1006.

When processing the original as multivalue data, the obtained 8-bit multivalue signal is directly transmitted to the file unit 5 without using the functions of the binary-coding circuit 1012 and the rotation circuit 1015. That is, the signal on the output signal line 1059 of the LUT circuit 1011 is input to the connector 1006 via the selectors 1013, 1014 and 1016.

Next, a description will be provided of a case of receiving information from the file unit 5. In the case of binary-coded filing, image information from the file unit 5 is transmitted to the signal line 1064 via the connector 1006. The signal on the signal line 1064 is input to the selectors 1014 and 1017.

When outputting image information from the file unit 5 to the printer unit 2, while rotating the image information, according to an instruction from the CPU 1003, the signal on the signal line 1064 input to the selector 1014 is rotated by the rotation circuit 1015. A signal on the output signal line 1062 of the rotation circuit 1015 is input to the pattern matching circuit 1018 via the selectors 1016 and 1017. That is, the selector 1017 receives the signal on the signal line 1063 and outputs a signal to the signal line 1065.

When directly outputting image information from the file unit 5 to the printer unit 2 according to an instruction from the CPU 1003, the signal on the signal line 1064 input to the selector 1017 is input to the pattern matching circuit 1018.

The pattern matching circuit 1018 has a function of smoothing any zigzag pattern in the contour of an image represented by the image information from the file unit 5. The signal subjected to pattern matching is input to the LUT circuit 1020 via the selector 1019.

The table stored in the LUT circuit 1020 can be changed by the CPU 1003 in order to output the image represented by the image information from the file unit 5 to the printer unit 2 with a desired density.

A signal on the output signal line 1068 of the LUT circuit 1020 is input to the magnification circuit 1022 via the selector 1021. The magnification circuit 1022 magnifies an 8-bit multivalue signal having two values (00H and FFH) by linear interpolation. The 8-bit multivalue signal having many values from the magnification circuit 1022 is transmitted to the reader unit 1 via the buffer 1010 and the connector 1001.

The reader unit 1 inputs this signal to the external I/F switching circuit 119 via the connector 120. The external I/F switching circuit 119 inputs the signal from the file unit 5 to the Y-signal generation/color detection circuit 113. The output signal of the Y-signal generation/color detection circuit 113 is subjected to the above-described processing, and is then output via the circuits 114, 115, 116, 117, and 118 to the printer unit 2, which forms an image on output paper.

In the case of multivalue filing, the signal on the output signal line 1065 from the selector 1017 is input to the LUT circuit 1020 via the selector 1019. The LUT circuit 1020 forms a look-up table in accordance with a desired printing density in response to an instruction from the CPU 1003.

A signal on the output signal line 1068 of the LUT circuit 1020 is input to the magnification circuit 1022 via the selector 1021. An 8-bit multivalue signal, magnified by the magnification circuit 1022 to a desired magnification, on the signal line 1070 is transmitted to the reader unit 1 via the buffer 1010 and the connector 1001. The information from the file unit 5 transmitted to the reader unit 1 is output to the printer unit 2, which forms an image on output paper.

Figure 5:
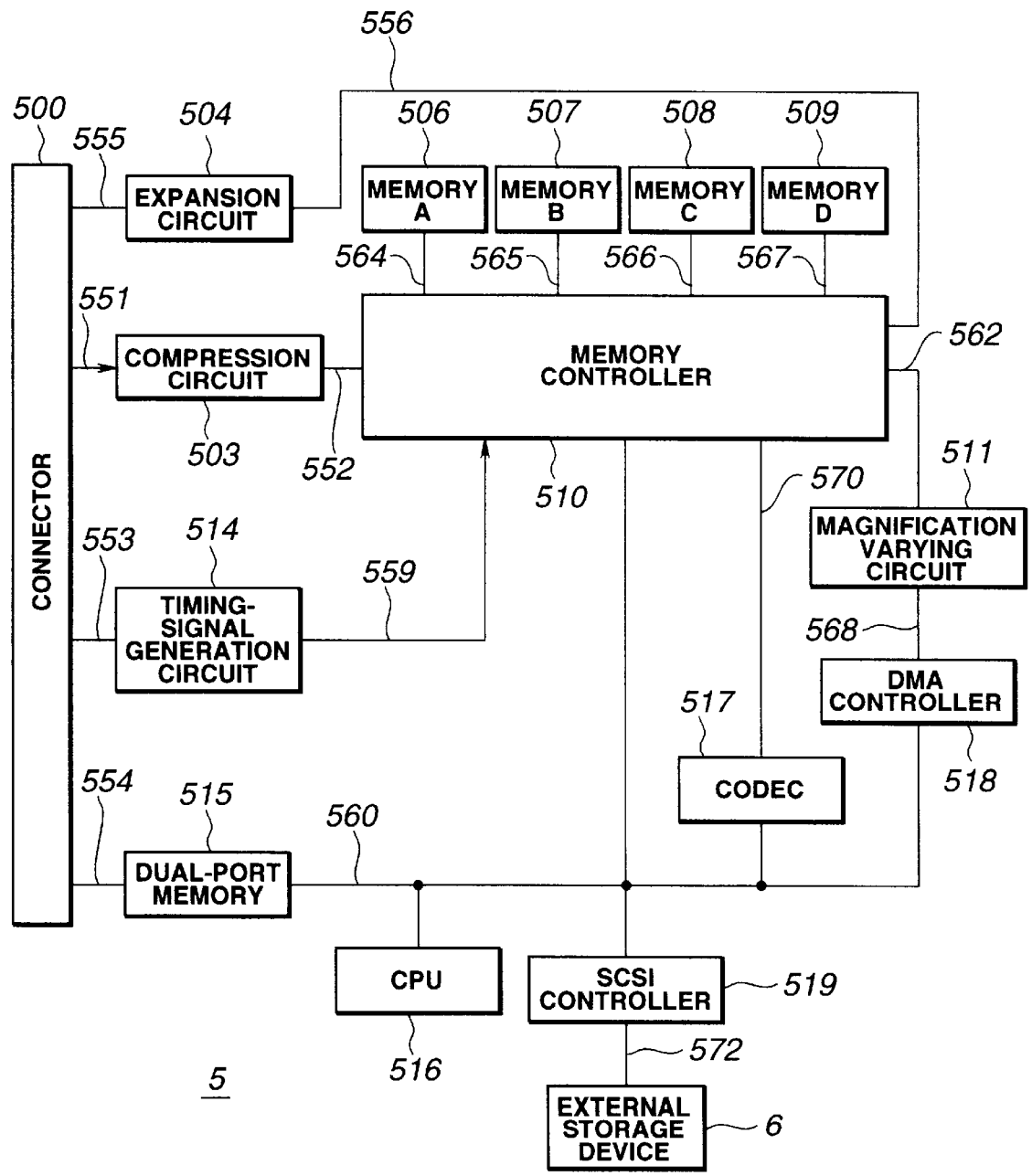
FIG. 5 is a block diagram illustrating a file unit shown in FIG. 1.

Next, the file unit 5 will be described in detail with reference to FIG. 5.

The file unit 5 is connected to the core unit 10 by a connector 500, and exchanges various kinds of signals therewith. An input multivalue signal from a signal line 551 is input to a compression circuit 503, where the signal is converted from multivalue image information into compressed information and is output to a memory controller 510.

The signal on an output signal line 552 of the compression circuit 503 is stored in one of memories A 506, B 507, C 508 and D 509, or two of these memories subjected to cascade connection, under the control of the memory controller 510.

The memory controller 510 has five functions, which are performed in 5 modes; i.e., a mode of exchanging data with the memories A 506, B 507, C 508 and D 509 via signal lines or buses 564, 565, 566, and 567, respectively, and a CPU bus 560 according instructions from a CPU (central processing unit) 516, a mode of exchanging data with a CODEC bus 570 of a CODEC (coder-decoder) 517 for performing coding/decoding, a mode of exchanging data of the contents of the memories A 506, B 507, C 508 and D 509 with a bus 562 from a magnification circuit 511 under the control of a DMA (direct memory access) controller 518, a mode of storing a signal on a signal line 553 in one of the memories A 506–D 509 under the control of a timing-signal generation circuit 514, and a mode of outputting the stored contents from one of the memories A 506–D 509 to a read signal line 556.

Each of the memories A 506, B 507, C 508 and D 509 has a capacity of 2 M (mega) bytes, and stores an A4-size image with a resolution of 400 dpi (dots per inch).

The timing-signal generation circuit 514 is connected to the connector 500 via a signal line 553. The timing-signal generation circuit 514 is started by a control signal (HSYNC (horizontal synchronization signal), HEN (horizontal enable signal), VSYNC (vertical synchronization signal) or VEN (vertical enable signal)) from the core unit 10, and generates a signal for achieving the following two functions.

The first function is a function of storing information from the core unit 10 in one or two of the memories A 506 D 509. The second function is a function of transmitting data from one of the memories A 506–D 509 to the read signal line 556.

A dual-port memory 515 is connected to the CPU 1003 of the core unit 10 via a signal line 554 and the connector 500, and to the CPU 516 of the file unit 5 via the signal line 560. Each of the CPU's exchanges commands via the dualport memory 515.

An SCSI (small computer system interface) controller 519 operates as an interface with the external storage device 6 connected to the file unit 5. More specifically, a storage medium, such as a magneto-optical disk or the like, is set in the external storage device 6. Data, such as image information and the like, are stored in the medium.

The CODEC 517 reads image information stored in one of the memories A 506–D 509, encodes the data by a desired method selected from MH, MR and MMR methods, and then stores the data in one of the memories A 506–D 509 as encoded information. The CODEC 517 also reads encoded information stored in one of the memories A 506–D 509, decodes the data by a desired method selected from the MH, MR and MMR methods, and then stores the data in one of the memories A 506–D 509 as decoded information.

Next, a description will be provided of an operation of storing file information in a storage medium set in the external storage device 6. An 8-bit multivalue image signal from the reader unit 1 is input to the connector 500, passes through the signal line 551, and is input to the compression circuit 503. The signal input to the compression circuit 503 is converted into compressed information on a signal line 552, which information is input to the memory controller 510.

The timing-signal generation circuit 514 generates a timing signal to a signal line 559 in response to a signal on the signal line 553 from the core unit 10. The memory controller 510 stores the compressed information on the signal line 552 in the memory A 506 in response to the timing signal.

The CPU 516 connects the memories A 506 and B 507 controlled by the memory controller 510 to the bus line 570 of the CODEC 517. The CODEC 517 reads compressed information from the memory A 506, encodes the information by the MR method, and writes the encoded information in the memory B 507.

Upon completion of the encoding by the CODEC 517, the CPU 516 connects the memory B 507 controlled by the memory controller 510 to the CPU bus 560. Then, the CPU 516 sequentially reads encoded information from the memory B 507, and transfers the read information to the SCSI controller 519. The SCSI controller 519 stores encoded information on a signal line 572 in the external storage device 6.

Next, a description will be provided of an operation of reading information from the external storage device 6 and outputting the read information to the printer unit 2.

Upon reception of a command for information retrieval/printing, the CPU 516 receives encoded information from the external storage device 6 via the SCSI controller 519, and transfers the encoded information to the memory C 508. At that time, the memory controller 510 connects the CPU bus 560 to the bus 566 of the memory C 508 according to an instruction from the CPU 516.

Upon completion of the transfer of the encoded information to the memory C 508, the CPU 516 connects the memories C 508 and D 509 to the bus 570 of the CODEC 517 by controlling the memory controller 510. The CODEC 517 reads encoded information from the memory C 508, sequentially decodes the read information, and transfers the decoded information to the memory D 509.

When magnification-varying processing, such as magnification, reduction or the like, is necessary when outputting data to the printer unit 2, the memory D 509 is connected to the bus 562 of the magnification-varying circuit 511, and the magnification of the contents of the memory D 509 is changed under the control of the DMA controller 518. The CPU 516 communicates with the CPU 1003 of the core unit 10 via the dual-port memory 515, and performs setting for printing an image by the printer unit 2 by transmitting data from the memory D 509 via the core unit 10.

Upon completion of this setting, the CPU 516 starts the timing-signal generation circuit 514, which outputs a predetermined timing signal to the memory controller 510 via the signal line 559. The memory controller 510 reads decoded information from the memory D 509 in synchronization with the signal from the timing-signal generation circuit 514, and transmits the read information to the signal line 556. The signal on the signal line 556 is input to an expansion circuit 504, which expands the signal.

A signal on an output signal line 555 of the expansion circuit 504 is output to the core unit 10 via the connector 500. Since the processing of output data from the connector 500 to the printer unit 2 has already been explained in the description of the core unit 10, a description thereof will be omitted.

Figure 6:
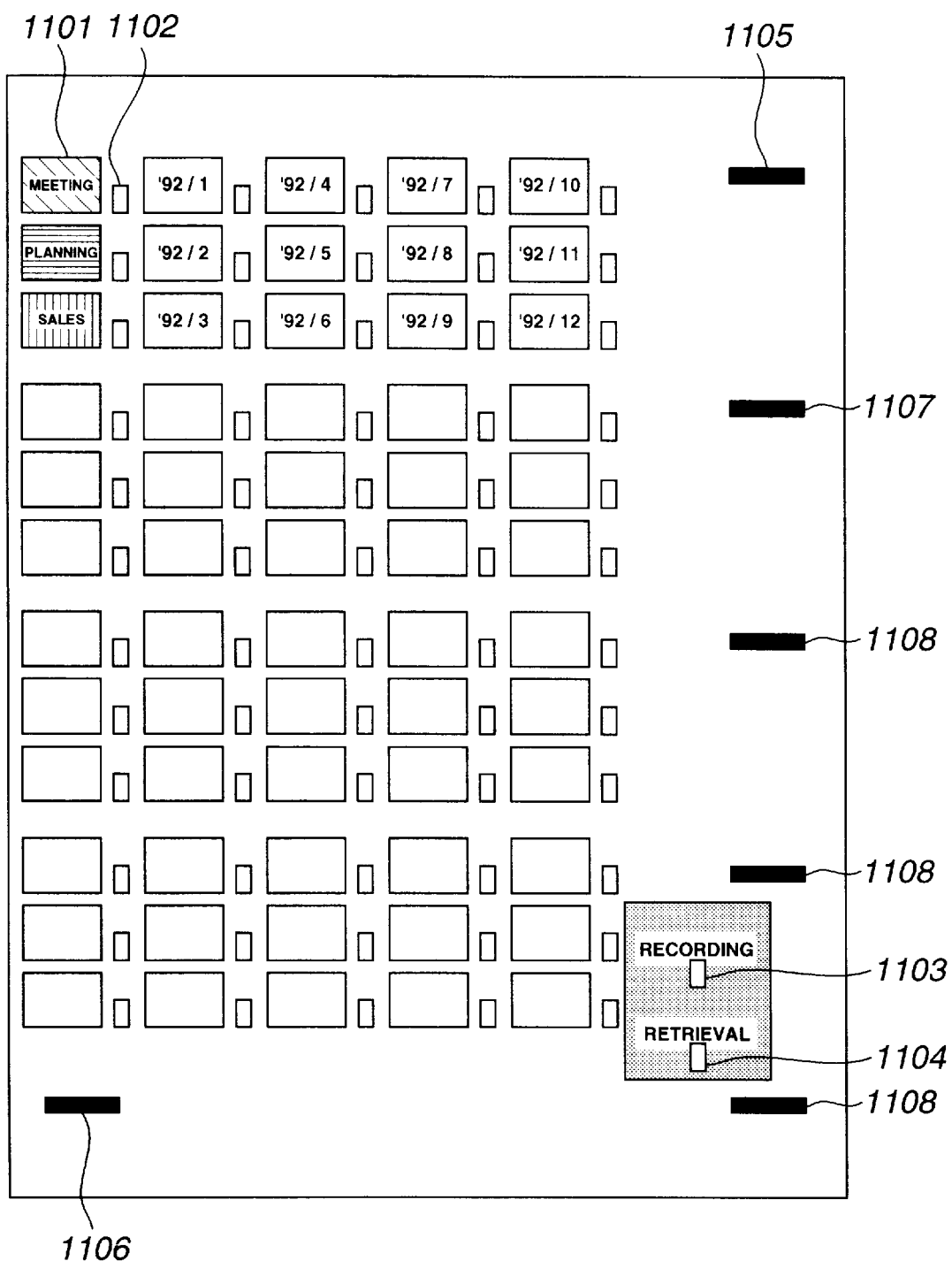
FIG. 6 is a diagram illustrating an example of a printed mark sheet.

FIG. 6 illustrates an example of a printed mark sheet in the present embodiment.

In FIG. 6, each index cell 1101 comprises a portion of a column where in order to retrieve a document image stored on a storage medium, such as a magneto-optical disk or the like, set in the external storage device 6 of the file unit 5, an index image corresponding to the document image is printed. The index image is recorded on the storage medium.

Each check column 1102 comprises a column which can be checked by the user in order to select a desired index cell 1101 when the user causes the apparatus to perform a retrieval operation. A check column 1103 comprises a column which is checked by the user when registering an index image corresponding to a document image, to be recorded in a storage medium of the external storage device 5, using this mark sheet. A check column 1104 comprises a column which is checked by the user when retrieving a document image recorded on a storage medium set in the external storage device 6. The user can select a desired index cell and a desired operation mode by checking respective columns using a pencil or the like.

Marks 1105 and 1106 identify the sheet as a mark sheet, and are also used for correcting misregistration of the mark sheet. A mark 1107 is used for discriminating between the up and down positions of the mark sheet, and for correcting misregisration of the mark sheet. A mark 1108 is used for correcting misregistration of the mark sheet.

The above-described mark sheet is formed according to the following procedures.

When forming a mark sheet, each index image stored on a storage medium set in the external storage device 6 of the file unit 5 is read.

The image of a format (see FIG. 7) of a mark sheet, having check columns for selecting a desired index cell, and check columns for selecting the execution of recording or retrieval, stored in a file control area of the storage medium is read and developed in one of memories A 506–D 509. Each index image read from the storage medium is synthesized with an appropriate one of the columns of index cells on the format of the mark sheet developed in the memory, and the obtained mark sheet is printed by the printer unit 2.

Figure 8:
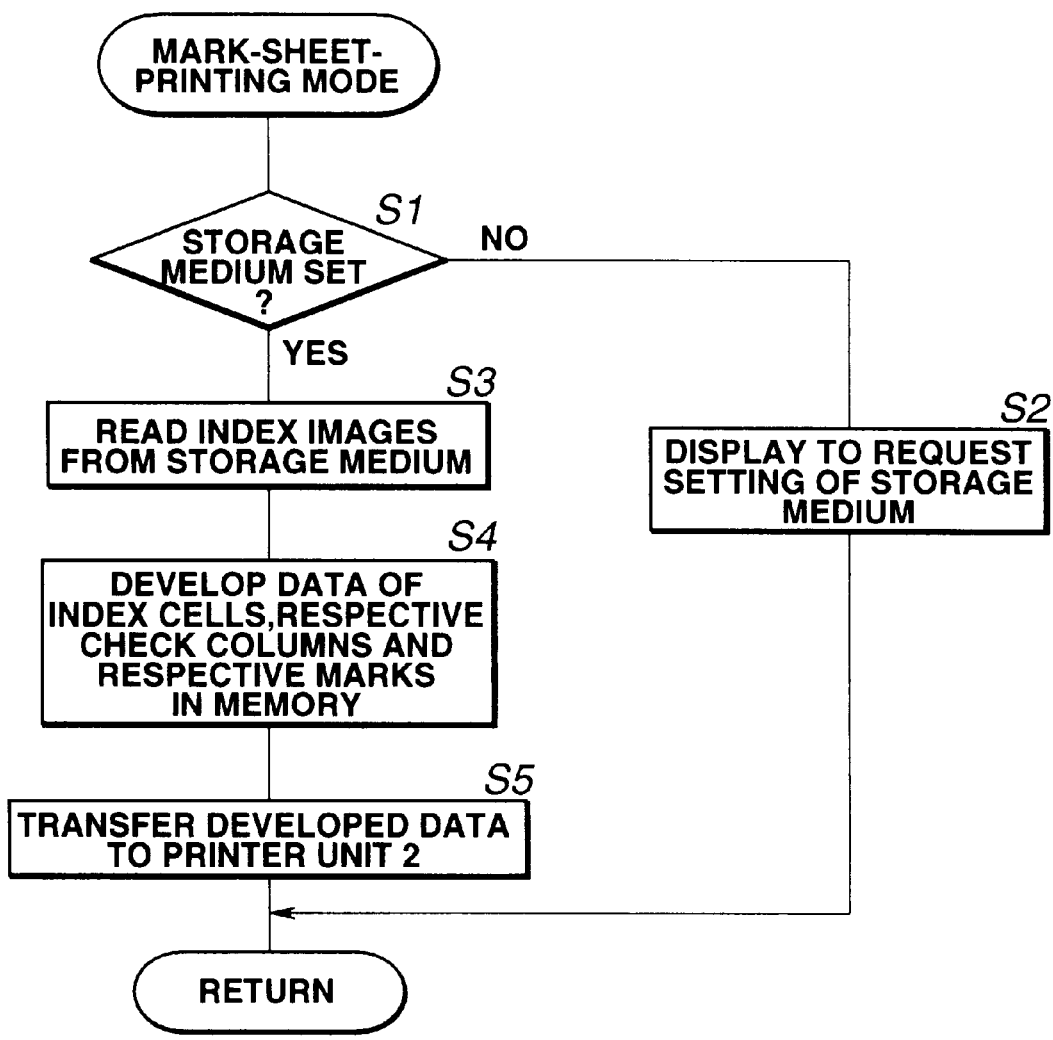
FIG. 8 is a flowchart illustrating procedures for forming a mark sheet.

FIG. 8 is a flowchart illustrating procedures executed by the file unit 5 for forming such a mark sheet.

When the user has set a mark-sheet-printing mode through the operation unit 124 of the reader unit 1, the CPU 516 determines if the storage medium is set in the external storage device 6 of the file unit 5 (step S1). If the result of the determination is negative, a request to set the storage medium is displayed on a display unit of the operation unit 124 of the reader unit 1 (step S2). If the result of the determination is affirmative, each index image stored in a predetermined region of the storage medium is read (step S3).

Figure 7:
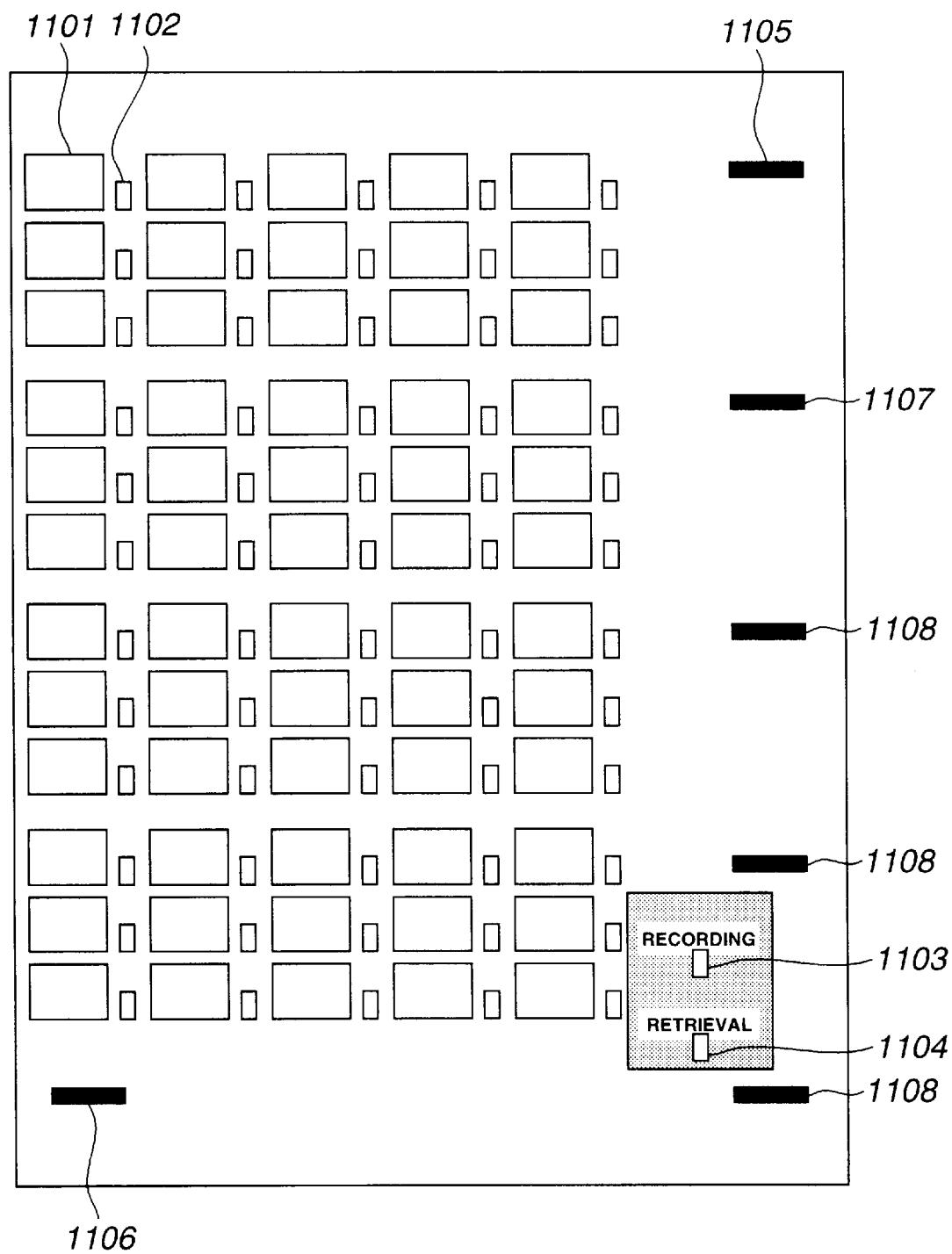
FIG. 7 is a diagram illustrating a format of a mark sheet.

The format of the mark sheet, including the check columns 1102 for selecting a desired index cell, the check columns 1103 and 1104 for selecting the execution of recording or retrieval, respectively, and the like shown in FIG. 7, is read from the above-described file control area, and is subjected to bit-map development in one of the memories A 506–D 509. The read index images are synthesized with the format of the mark sheet developed in the memory (step S4), and the obtained data is transferred to the printer unit 2 in the above-described manner (step S5). Thus, the mark sheet is output from the printer unit 2. For example, index images read from the external storage device 6 by the CPU 516 are placed within previously blank index cells 1101 of the mark sheet, as seen in FIG. 6. The apparatus then returns to the functions it performed before entering the mark-sheet-printing mode.

Recording and retrieval of document images using the above-described mark sheet are performed in the following manner.

First, when recording document images on the storage medium, the user checks the check column 1103 for recording on the mark sheet, and a check column in the vicinity of a desired index cell. This mark sheet is made the first page of a bundle of documents to be read, and the bundle of documents is sequentially read from the first page by the reader unit 1.

When retrieving document images recorded on the storage medium, the user checks the check column 1104 for retrieval on the mark sheet, and the mark sheet is read by the reader unit 1.

The image read by the reader unit 1 is transmitted to the file unit 5 and is stored in one of the memories A 506–D 509. The CPU 516 determines if the original stored in the one of the memories A 506–D 509 is a mark sheet according to the presence of the mark 1105 or 1106 indicating the mark sheet.

The mark sheet read by the reader unit 1 is in some cases misregistered with respect to the format stored in one of the memories A 506–D 509 when printing the mark sheet, due to a deviation in the vertical or horizontal direction, rotation, expansion and contraction of the mark-sheet paper, and the like. The amounts of deviation are determined using the marks 1105–1108 for correcting misregistration, and the check columns are determined in accordance with the result of the determination. Thus, it is possible to determine if the mark sheet has been exactly checked.

If the check column 1103 for recording on the mark sheet is checked, subsequently read originals are stored on the storage medium of the external storage device 6 so as to correspond to the index image of the checked index cell.

If the check column 1104 for retrieval on the mark sheet is checked, data from the storage medium of the external storage device 6 is retrieved in accordance with a check in the check columns 1102, and document images corresponding to the selected index cell are displayed on the display unit of the operation unit 124.

When only one document image has been retrieved, the document image is output by the printer unit 2. When a plurality of document images have been retrieved, this fact is displayed on the display unit of the operation unit 124 together with the number of candidate images. The user determines whether the retrieval must be stopped, whether the retrieval must be continued according to the list of registered names, whether the retrieval must be continued while outputting some of the images, or whether all of the document images must be output. The selected document images are printed by the printer unit 2.

Figure 9:
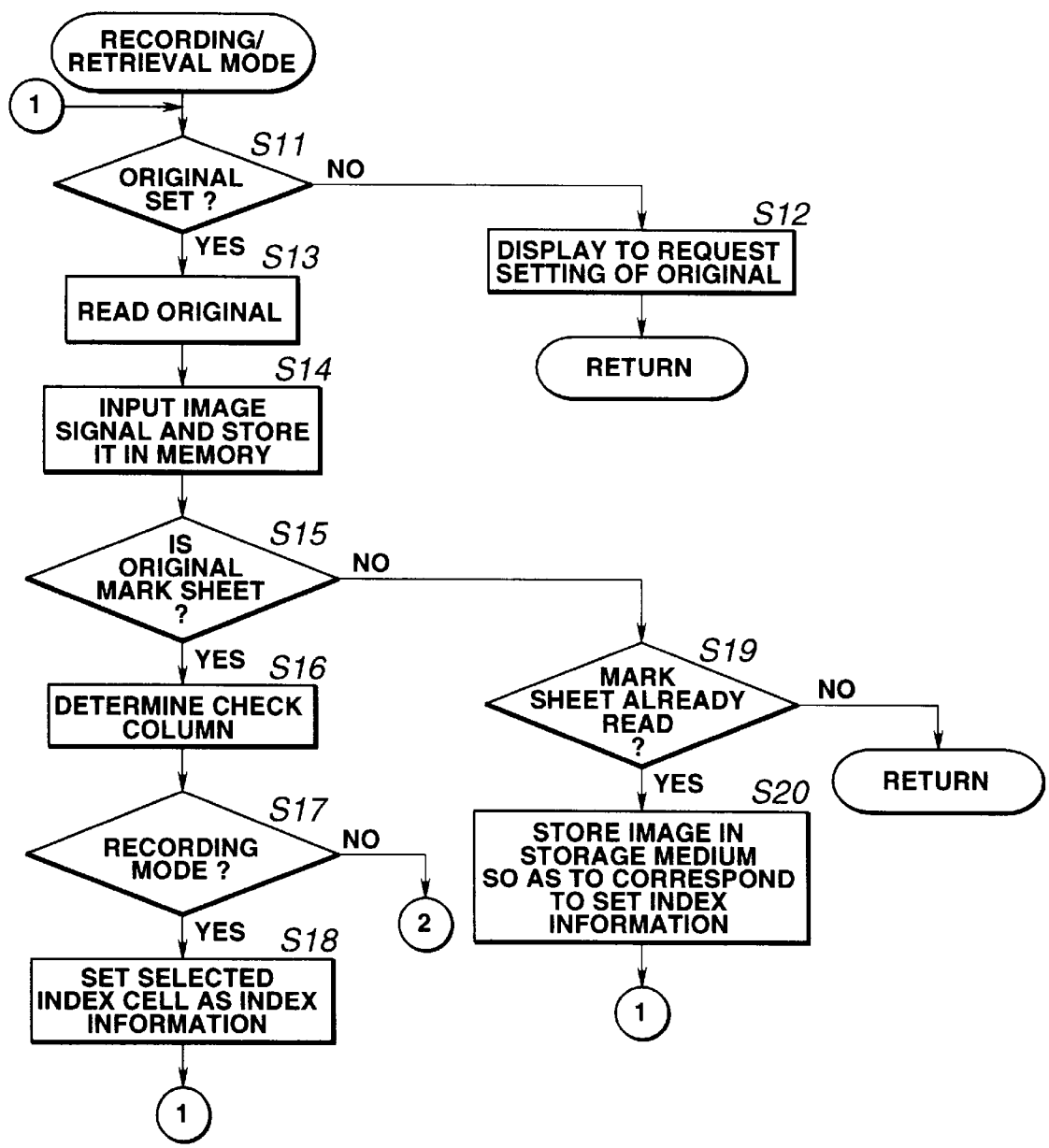
FIG. 9 is a flowchart illustrating procedures for recording a document image using a mark sheet.
Figure 10:
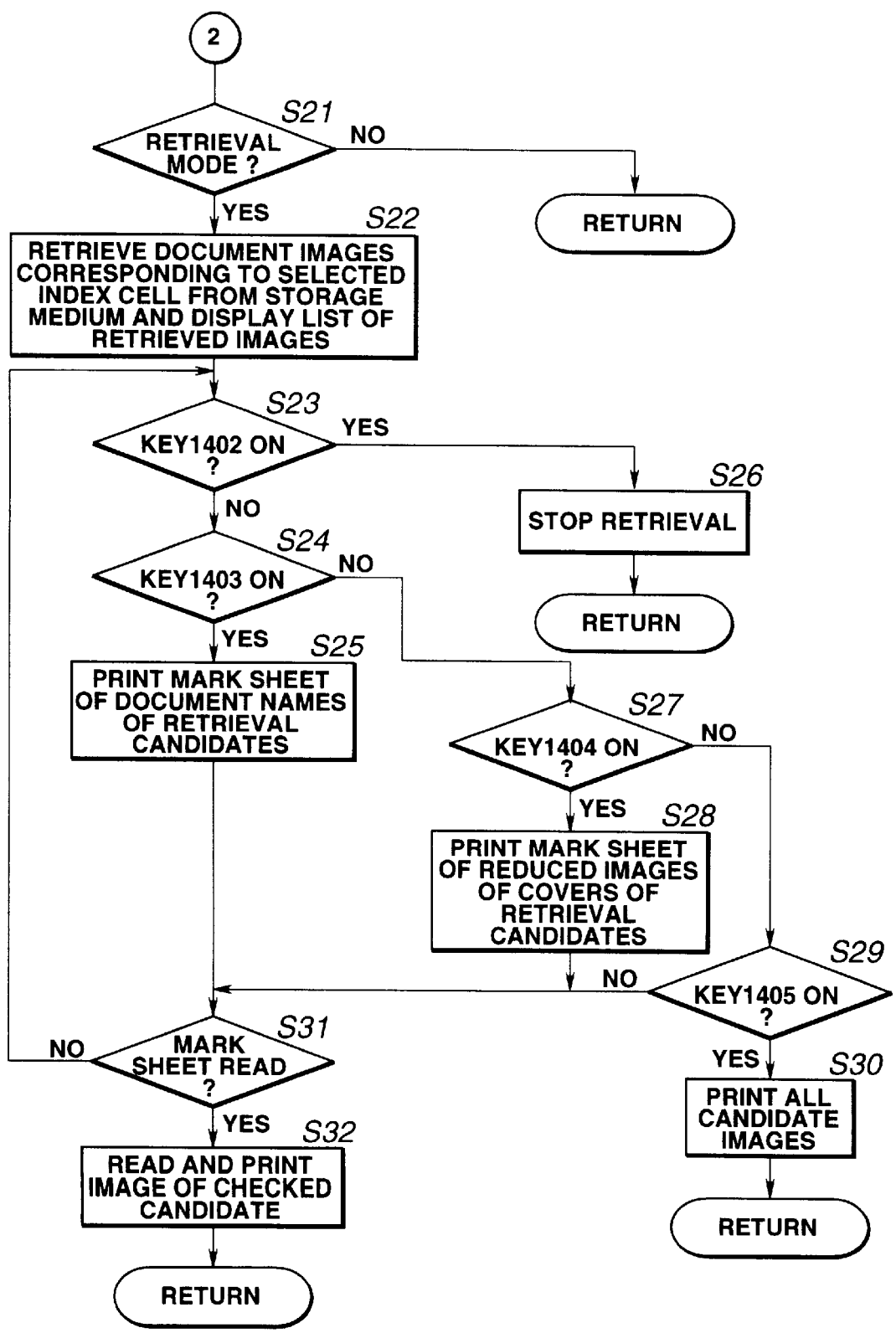
FIG. 10 is a flowchart illustrating procedures for retrieving a document image using a mark sheet.

FIGS. 9 and 10 are flowcharts illustrating procedures for recording/retrieving document images using the above-described mark sheet.

First, the CPU 122 determines if an original has been set on the original-feeding device 101 (step S11). If the result of the determination is negative, a display to request setting of an original is performed on the display unit of the operation unit 124 (step S12). The apparatus then returns to the functions it performed before entering the recording/retrieval mode. If the result of the determination is affirmative, the original is fed onto the platen, and the image of the original is read (step S13).

Image information of the original read by the reader unit 1 is transmitted to the file unit 5, and is stored in one of the memories A 506–D 509 (step S14). The CPU 516 determines if the image stored in the one of the memories A 506–D 509 is the image of the mark sheet according to the presence of the mark 1105 or 1106 indicating that the mark sheet is present (step S15).

As described above, when the original read by the reader unit 1 is a mark sheet, the read image of the mark sheet is in some cases misregistered with respect to the format stored in one of the memories A 506–D 509 due to a deviation (a deviation in the vertical or horizontal direction, or a rotation deviation) in the position of the original mounted on the platen of the reader unit 1, expansion or contraction of the mark-sheet paper, and the like. The amounts of deviation are determined by the CPU 516 using the marks 1105–1108 for misregistration correction, and whether the check columns are checked is determined by the CPU 516 in accordance with the result of the determination (step S16).

If the check column 1103 for recording on the read mark sheet is checked, the images of originals read after the mark sheet are stored in the storage medium of the external storage device 6 so as to correspond to the index image of the index cell.

The processing in step S16 when the original has been determined to be the mark sheet in step S15 will now be described in detail.

If the mark 1107 for discriminating between the up and down positions of the mark sheet is present immediately below the mark 1105, it is determined that the up and down positions of the mark sheet are correct. If the mark 1107 is absent, i.e., if the mark sheet is identified by the mark 1106, it is determined that the up and down positions of the mark sheet are reversed.

More specifically, the amounts of misregistration in the vertical and horizontal directions are measured based on image information indicating the amounts of deviation of the marks 1105, 1107 and 1108 for misregistration correction from the format for printing the mark sheet.

The amount of misregistration due to rotation from the format for printing the mark sheet is measured using image information of two adjacent marks from among the marks 1105, 1107 and 1108 for misregistration correction. Expansion or contraction of the mark-sheet paper in the vertical direction from the format when the mark sheet has been printed is measured using image information of two adjacent marks from among the marks 1105, 1107 and 1108 for misregistration correction. Expansion or contraction of the mark-sheet paper in the horizontal direction from the format when the mark sheet has been printed is measured using image information of the marks 1106 and 1108 for misregistration correction.

The positions of the check columns for index cells and the check columns for recording and retrieval can be estimated from the measured values. Accordingly, by changing the address of image information, the checking of the check columns can be determined taking into consideration the misregistration of the mark sheet. In order to correct the up and down positions of the mark sheet, information may be read from the memory in the reverse sequence and the read information may be stored again.

After the processing in step S16, the CPU 516 determines if the check column 1103 for recording on the mark sheet has been checked (step S17). If the result of the determination is affirmative, a recording process is executed in a recording mode, in which the checked check column 1102 and the corresponding index cell are set as index information (step S18), and the process proceeds to step S11. Originals read after the mark sheet is read are stored in the storage medium of the external storage device 6 so as to correspond to the selected index cell (steps S19 and S20). If the CPU 516 determines that the mark sheet has not already been read in step S19, the apparatus returns to the functions it performed before entering the recording/retrieval mode.

At that time, when it has been determined by the CPU 516 that the up and down positions of the mark sheet are reversed, information indicating the reversal of the up and down positions of the document image is added by the CPU 516 to the document image, and the combined information is stored in the storage medium of the external storage device 6 in accordance with the selected index cell.

If the result of the determination in step S17 is negative, the CPU 516 determines if the check column 1104 for retrieval on the mark sheet has been checked (step S21). If the result of the determination is negative, the apparatus returns to the functions it performed before entering the process performed in step S21 and before entering the recording/retrieval mode. If the result of the determination is affirmative, a retrieval process is executed in a retrieval mode, in which data in the storage medium of the external storage device 6 is retrieved, and the list of document images corresponding to the index cell checked in one of the check columns 1102 is displayed on the display unit of the operation unit 124 (step S22).

Figure 11:
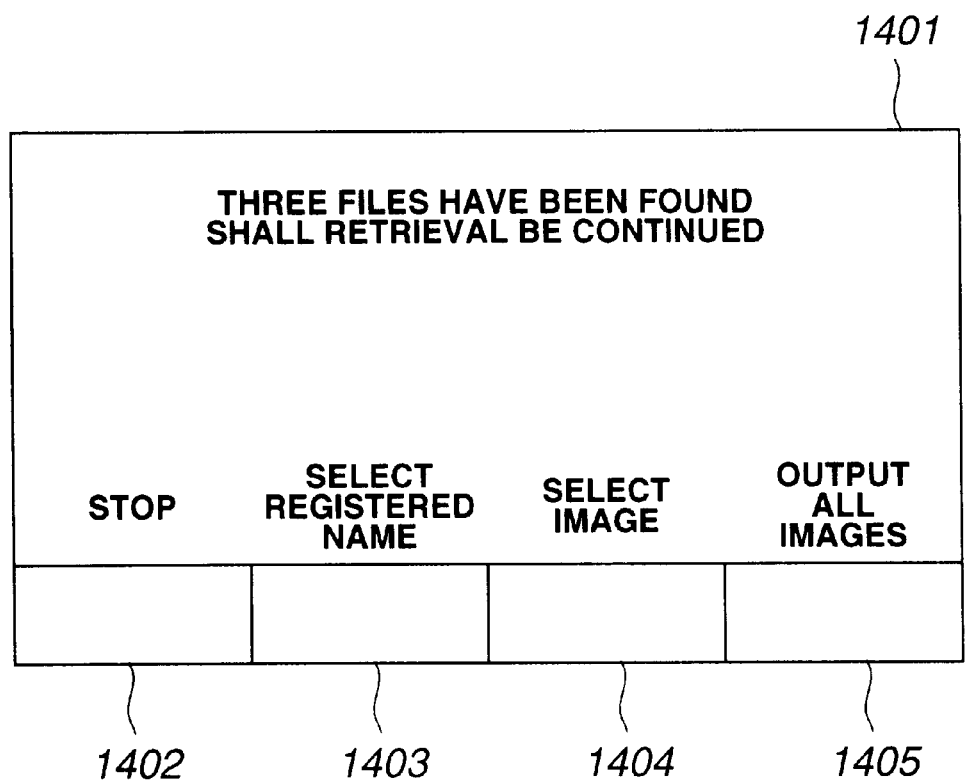
FIG. 11 is a diagram illustrating a display picture surface of an operation unit when retrieving images.

When a plurality of document images have been retrieved, as shown in FIG. 11, the presence of the plurality of candidates is displayed on a display portion 1401 of the operation unit 124 together with the number of the candidates as a message. The user then inputs whether the retrieval must be stopped, whether the retrieval must be continued according to the list of registered names, whether the retrieval must be continued while outputting selected images, or whether all of the document images must be output, through selection keys 1402–1405 shown in FIG. 11 (steps S23, S24, S27 and S29).

Figure 12:
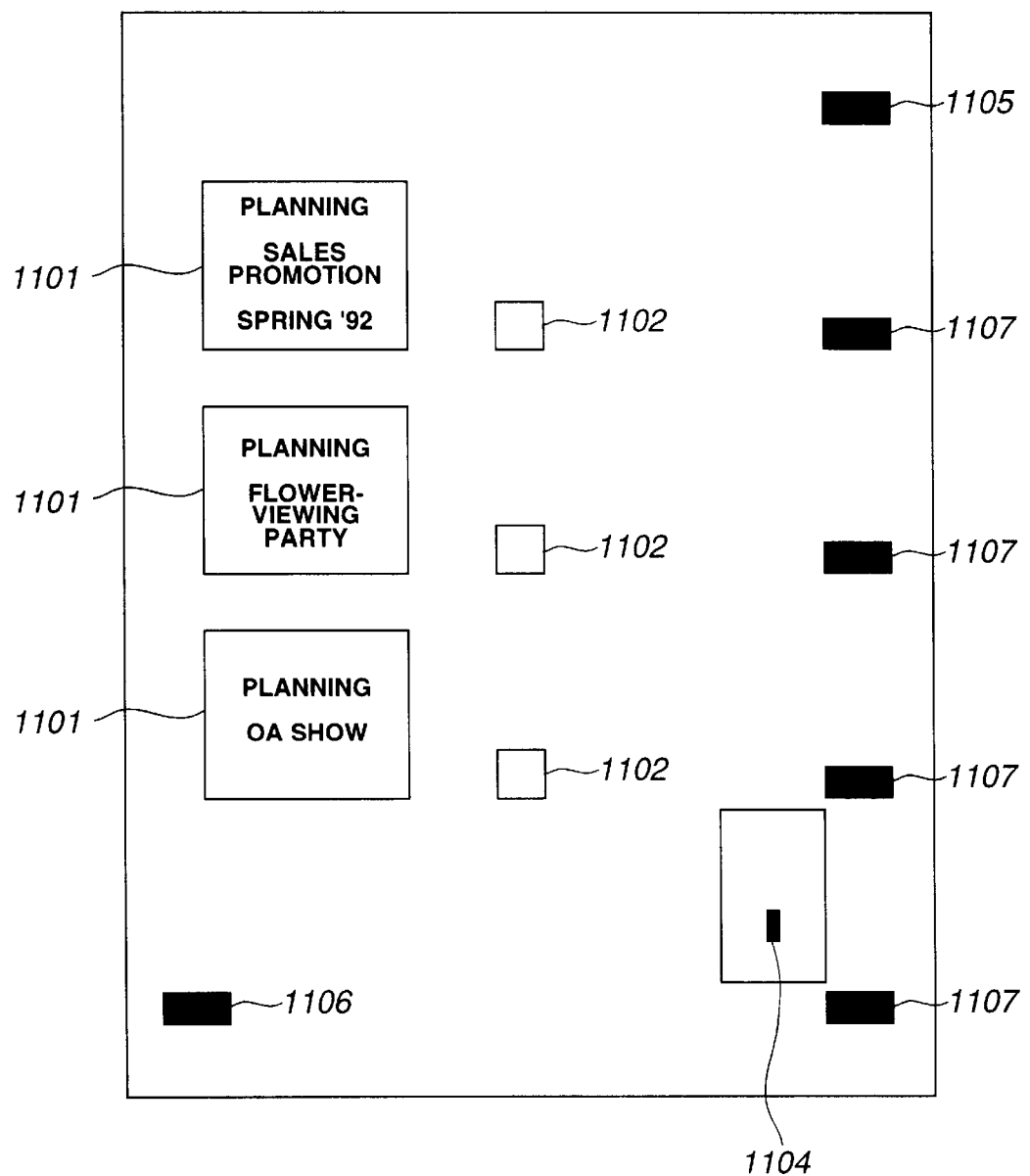
FIG. 12 is a diagram illustrating a mark sheet of another format.
Figure 13:
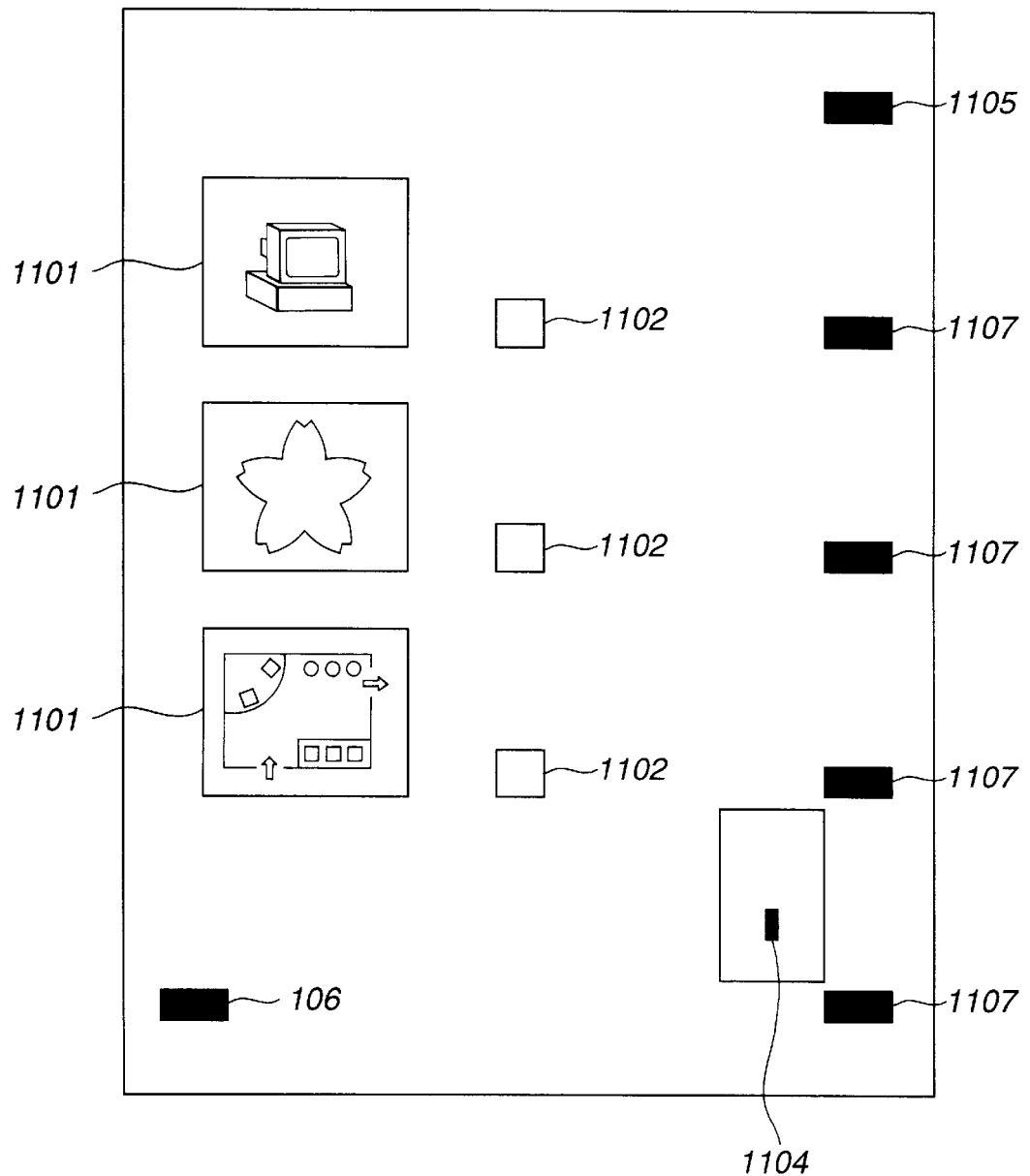
FIG. 13 is a diagram illustrating a mark sheet of still another format.

When the selection key 1402 has been depressed, the retrieval is stopped (step S26). The apparatus then returns to the functions it performed before entering the recording/retrieval mode. When the selection key 1403 has been depressed, the document names of candidate document images are synthesized in the index cells 1101 of the mark sheet shown in FIG. 12 (step S25). When the selection key 1404 has been depressed, the first pages of candidate document images are synthesized while being reduced in the index cells 1101 of the mark sheet shown in FIG. 13 having a format different from that shown in FIG. 6, and the obtained mark sheet is printed by the printer unit 2 (step S28). This reduction is accomplished by magnification circuit 511.

When the selection key 1405 has been depressed, all of the candidate document images are printed by the printer unit 2 (step S30). The apparatus then returns to the functions it performed before entering the recording/retrieval mode. After the selection key 1403 or 1404 has been depressed and the mark sheet shown in FIGS. 12 or 13 has been printed, desired document images can be retrieved by selecting the first page of the desired document images, checking the corresponding check column 1102, and causing the reader unit 1 to read the checked mark sheet (step S31). The retrieved document images are then output by the printer unit 2 (step S32). The apparatus then returns to the functions it performed before entering the recording/retrieval mode. If the reader unit 1 does not read the checked mark sheet, the method returns to step S23.

Figure 14:
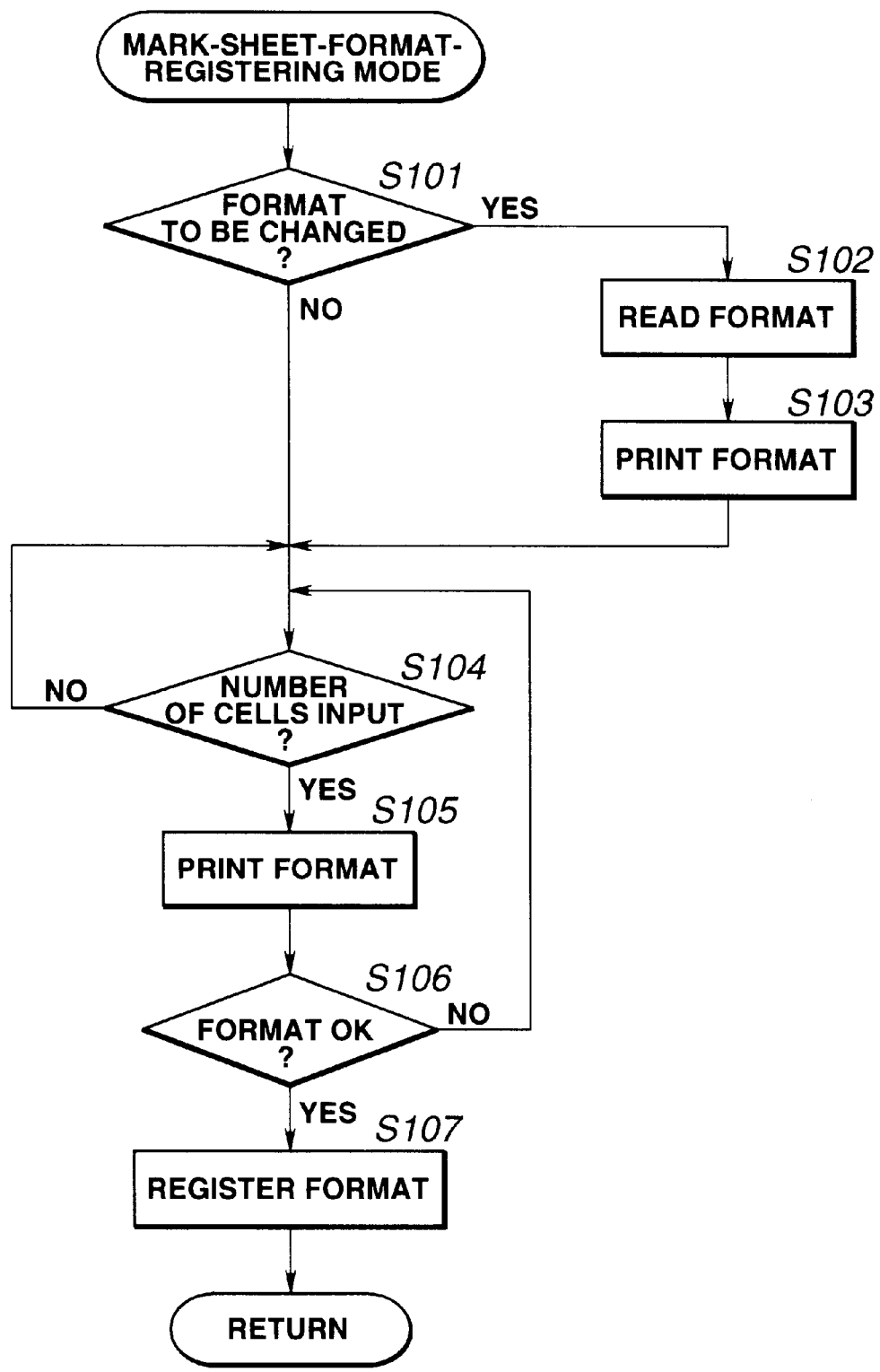
FIG. 14 is a flowchart illustrating an operation of registering a format of a mark sheet.

Next, a description will be provided of the method of registering a new format of a mark sheet or changing a format of a mark sheet, with reference to a flowchart shown in FIG. 14.

When a mark-sheet-format registering mode has been assigned and set through the operation unit 124, registration of a new format or a change in a format is selected (step S101). When changing a format, the format stored in the file control area of the storage medium of the external storage device 6 is read (step S102), and the format is printed (step S103).

After seeing the printed format or if the format is not to be changed, the user inputs the number of index cells M×N (5×12 in the case of FIG. 6) (step S104). When forming a new format, the user immediately input the number M×N because there is no format yet to be printed. If the user does not input the number of index cells, the method returns to step S104 to await the inputting of this data.

When the number of index cells M×N has been input in the above-described manner, index cells are arranged in the format of M×N, and the format is printed (step S105).

Thereafter, the user determines if the printed format is a good one and inputs the result of the determination (step S106). If the result of the determination is affirmative, the process proceeds to step S107, in which the format is registered in the file control area of the storage medium of the external storage device 6. The apparatus then returns to the functions it performed before entering the mark-sheet-format-registering mode. If the result of the determination in step S106 is negative, the process returns to step S104, and the above-described processing is repeated.

As described above, the user can register a new format of a mark sheet, or change a format and register the changed format.

Figure 15:
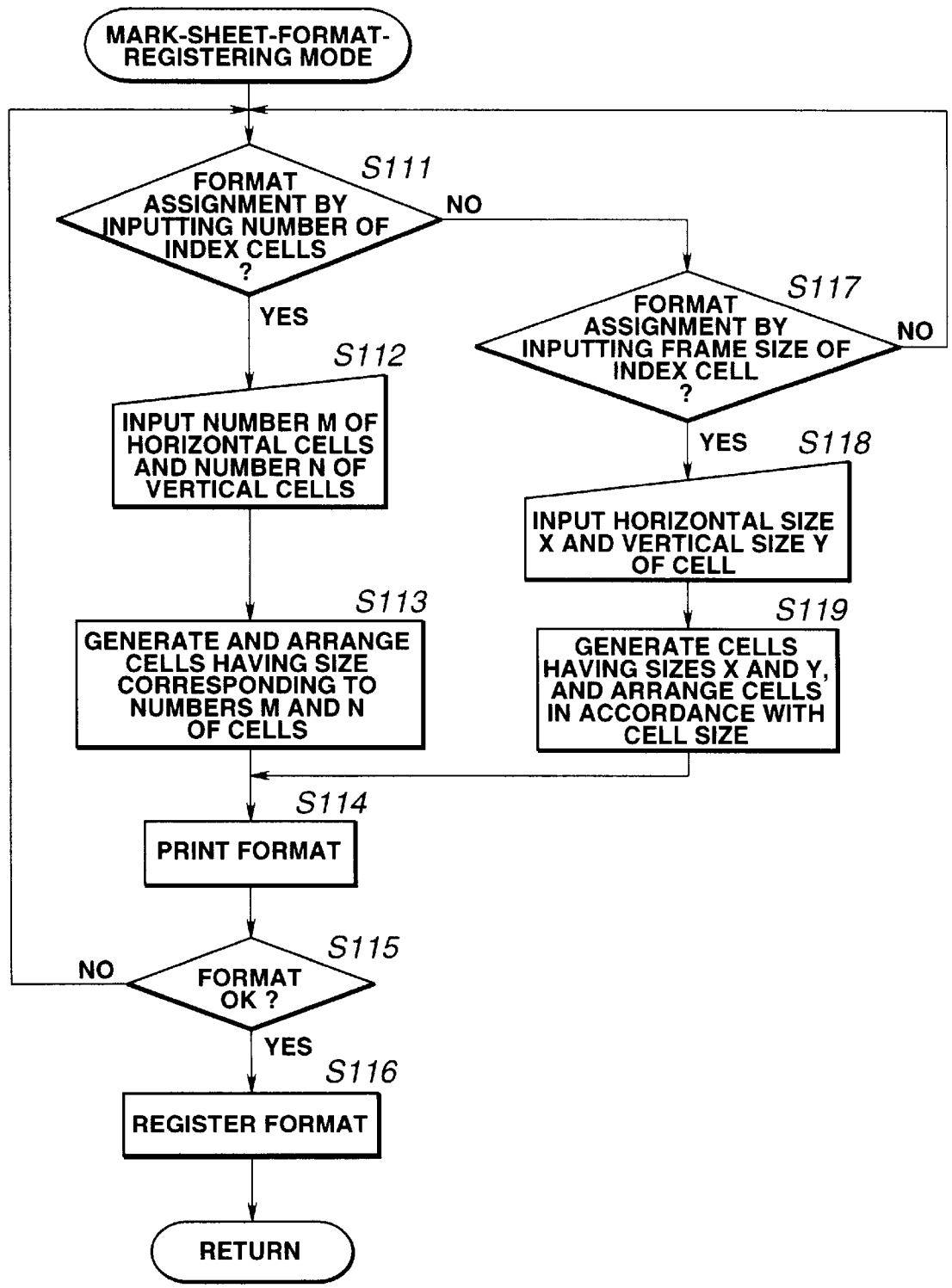
FIG. 15 is a flowchart illustrating another operation of registering a format of a mark sheet.

Next, a description will be provided of another method of registering a format in a mark-sheet-format-registering mode. FIG. 15 is a flowchart of this method.

When the mark-sheet-format-registering mode has been set through the operation unit 124, the user is requested to determine if format assignment by inputting the number of index cells must be selected (step S111). If the result of the determination is affirmative, the user is requested to input the number M of horizontal cells and the number N of vertical cells (step S112). Then, cells having a size corresponding to the input numbers of cells M and N are generated, and the cells are arranged on the format in accordance with the numbers of cells M and N (step S113). At the same time, other marks and the like are also arranged, and the obtained format is printed (step S114).

Then, the user is requested to determine if the format is a good one (step S115). If the result of the determination is negative, the process returns to step S111. If the result of the determination in step S115 is affirmative, the format is registered in the file control area of the storage medium (step S116), and the apparatus returns to the functions it performed before entering the mark-sheet-format-registering mode.

If the result of the determination in step S111 is negative, the user is requested to determine if format assignment by inputting the frame size of index cells must be selected (step S117). If the result of the determination is negative, the process returns to step S111.

If the result of the determination in step S117 is affirmative, the user is requested to input a horizontal size X and a vertical size Y of a single cell (step S118). Thereafter, cells having the input sizes X and Y are generated, and the cells are arranged in accordance with the cell size (step S119), and the process proceeds to step S114.

Figure 16:
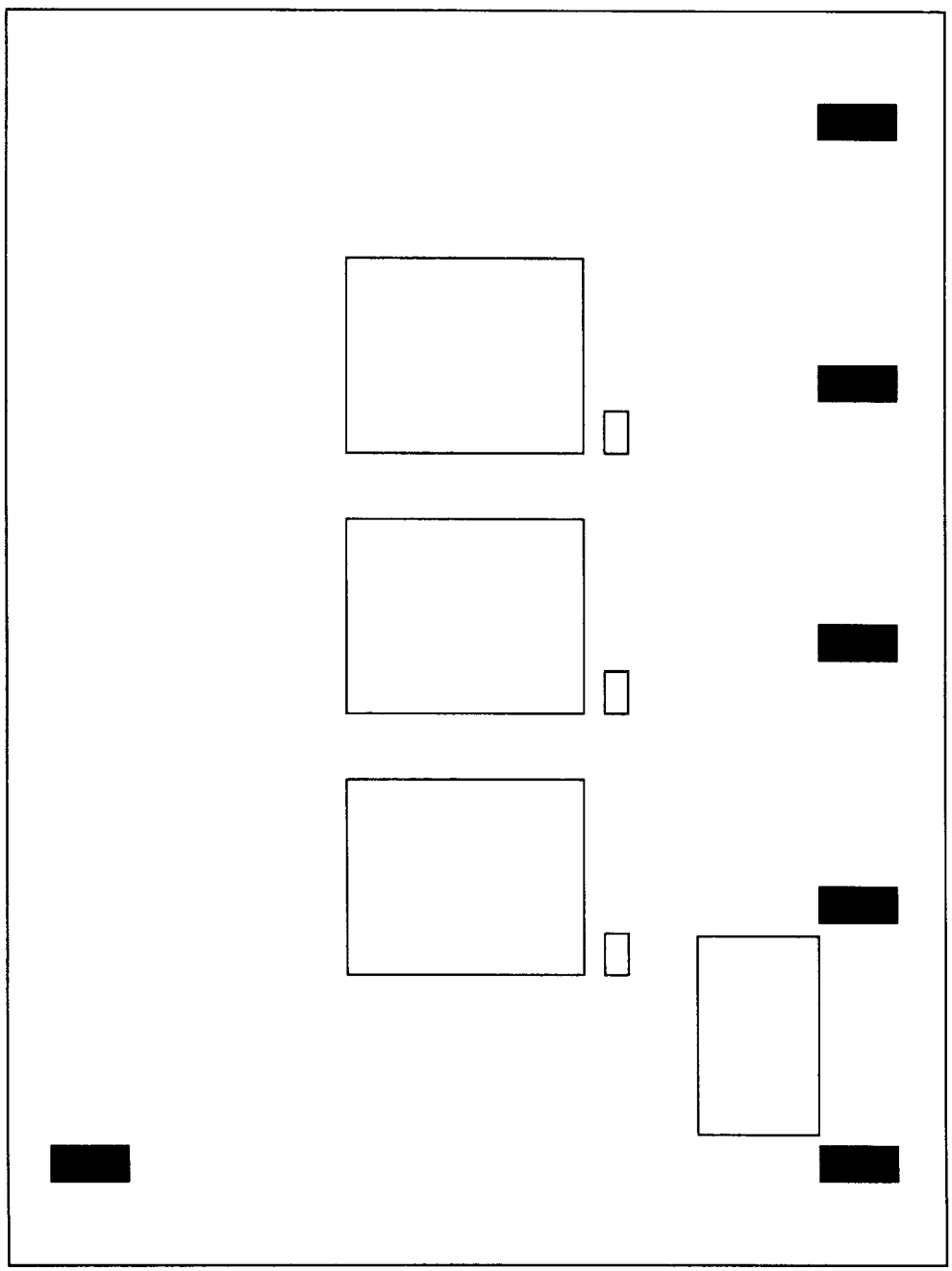
FIGS. 16 through 18 are diagrams illustrating marksheet formats.
Figure 17:
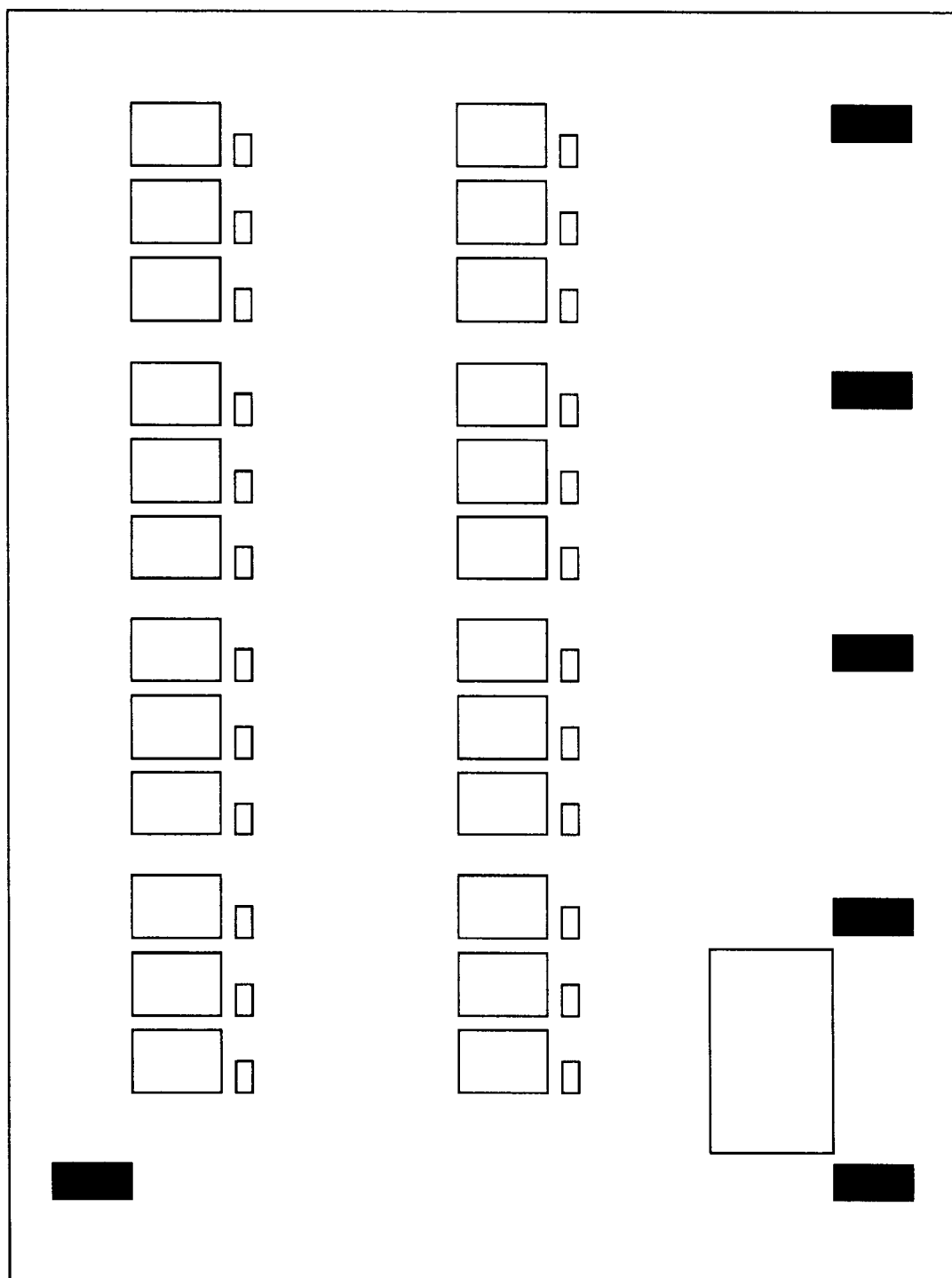
Figure 18:
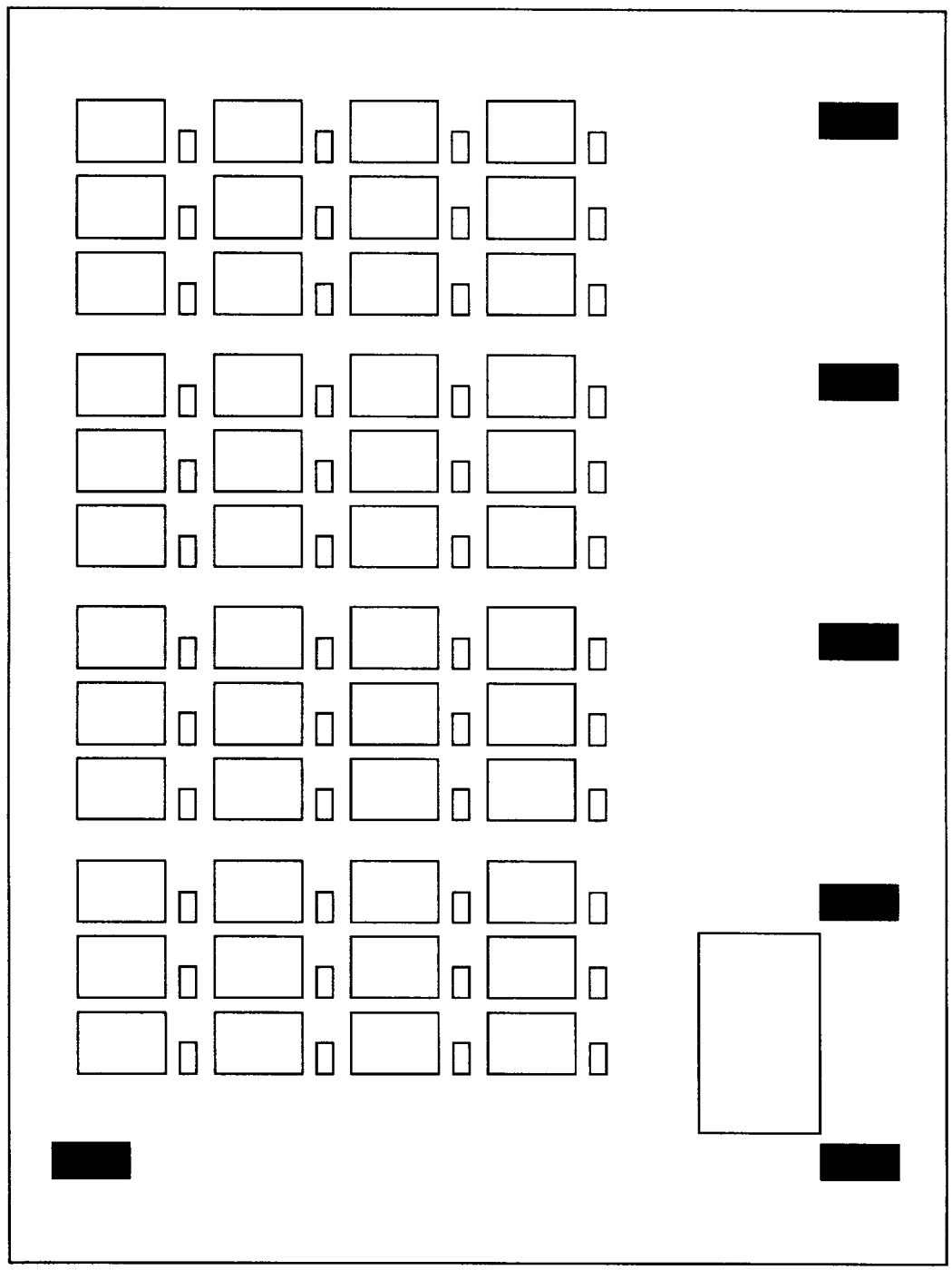

For example, in the case of assignment by inputting the number of cells, if M=1 and N=3 are input, a format as shown in FIG. 16 is obtained. If M=2 and N=12 are input, a format as shown in FIG. 17 is obtained. Thus, a format including cells whose size is adapted to the number of the cells is obtained. In the case of assignment by inputting the frame size of cells, if X=7 cm and Y=5 cm are input, a format as shown in FIG. 16 is obtained. If X=2 cm and Y=1.5 cm are input, a format as shown in FIG. 18 is obtained. Thus, a format including cells whose number is adapted to the frame size of the cells is obtained.

Although in the above-described embodiment, registration of a new format, and a change in a format and registration of the changed format are performed through the operation unit 124, a better operability of the apparatus can be realized by utilizing a display, a keyboard, a mouse or the like as a man-machine interface. Although a format has been printed in each of steps S103 and S105 shown in FIG. 14, the format may be displayed and confirmed on a display (not shown) provided on the operation unit 124.

When performing retrieval or additional storage of a document image using the above-described mark sheet, it is necessary to print a mark sheet to be used in such processing every time, and to check desired check columns.

In order to simplify such a checking operation, when terminating retrieval of a document image in the above-described manner, a mark sheet, in which check marks are provided on retrieved check columns, may be printed, and the checked mark sheet may be used in the next retrieval operation.

The checked mark sheet may be printed before or after the output of the retrieved document images. Such a mark sheet may be printed on the back of the first page or the final page of retrieved document images.

In a system including sheet-feeding means for accommodating a plurality of kinds of paper or sheet sizes, the checked mark sheet may be printed onto a sheet having a size or a color different from that of the retrieved document images, so that it is possible to easily discriminate between the document images and the mark sheet.

The individual components shown in outline or designated by blocks in the drawings are all well known in the image retrieval apparatus arts and their specific construction and operation are not critical to the operation or the best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image recording apparatus, comprising:

input means for inputting information relating to a layout of a mark sheet having thereon a plurality of index cells each containing a document index image corresponding to a document image to be retrieved from or stored in a document storage apparatus, and having thereon check columns on which a user can manually designate retrieval or storage of the document corresponding to the document index images on the mark sheet;

generation means for generating a format in accordance with information input from said input means; and means for storing the plurality of document index images and document images;

image forming means for forming the format generated by said generation means on a sheet to form the mark sheet having thereon a plurality of index cells each containing a document index image corresponding to a document image, stored in said storing means, to be retrieved from or stored in a document storage apparatus, and having thereon check columns on which a user can manually designate retrieval or storage of the document corresponding to the document index images on the mark sheet, said image forming means reading the document index images from said storing means and synthesizing each document index image with an index cell to form a plurality of index cells each containing a document index image therein, wherein said input means inputs the number of cells to be recorded on a single mark sheet, and said generation means generates a format in which index cells having a size corresponding to the number of index cells input from said input means are arranged, or said input means inputs data relating to the size of the index cells, and said generation means generates a format in which index cells whose number corresponds to the size of the index cells input from said input means are arranged.

2. A mark-sheet recording method, comprising the steps of:

inputting information relating to a layout of a mark sheet having thereon a plurality of index cells each containing a document index image corresponding to a document image to be retrieved from or stored in a document storage apparatus, and having thereon a check column on which a user can manually designate retrieval or storage of the document corresponding to the document index images on the mark sheet;

generating a format in accordance with the input information;

storing the plurality of document index images and document images; and forming the generated format on a sheet to form a mark sheet having thereon a plurality of index cells each containing a document index image corresponding to a document image, stored in said storing step, to be retrieved from or stored in a document storage apparatus, and having thereon a check column on which a user can manually designate retrieval or storage of the document corresponding to the document index image on the mark sheet, said forming step comprising the steps of reading the document index images stored in said storing step and synthesizing each document index image with an index cell to form a plurality of index cells, each containing a document index image therein, wherein said inputting step inputs the number of index cells to be recorded on a single mark sheet, and cells generating step generates a format in which index cells having a size corresponding to the number of index images input from said input means are arranged or said inputting step inputs data on the size of the index cells, and said generating step generates a format in which index cells whose number corresponds to the size of the index cells input in said inputting step are arranged.

3. An image recording apparatus, comprising:

reading means for reading document images;

storing means for storing a plurality of document index images and the document images;

input means for inputting information relating to a layout of a mark sheet having thereon a plurality of index cells each containing a document index image corresponding to a document image to be stored in said storing means, and having thereon check columns on which a user can manually designate storage of the document corresponding to the document index images on the mark sheet;

generation means for generating a format in accordance with information input from said input means; and image forming means for forming the format generated by said generation means on a sheet to form the mark sheet having thereon a plurality of index cells each containing a document index image corresponding to a document image, stored in said storing means, and having thereon check columns on which a user can manually select the document index images on the mark sheet, said image forming means reading the document index from said storing means and synthesizing each document index image with an index cell to form a plurality of index cells each containing a document index image therein.

4. An apparatus according to claim 3, wherein said input means inputs the number of document index images to be recorded on a single mark sheet, and wherein said generation means generates a format in which document index images having a size corresponding to the number of document index images input from said input means are arranged.

5. An apparatus according to claim 3, wherein said input means inputs data relating to the size of the document index images, and wherein said generation means generates a format in which document index images whose number corresponds to the size of the document index images input from said input means are arranged.

6. An apparatus according to claim 3, wherein said input means inputs the number of document index images to be recorded on a single mark sheet, and wherein said generation means generates a format corresponding to the number of document index images input from said input means.

7. An apparatus according to claim 3, further comprising:

retrieval means for retrieving an image stored in a storage medium; and reading means for reading a mark sheet, wherein said retrieval means retrieves the image of a document stored in the storage medium corresponding to a document index image designated by the user by marking a mark in a check column associated with the document index image on the mark sheet read by said reading means.

8. A mark-sheet recording method, comprising the steps of:

reading document images;

storing a plurality of document index images and the read document images;

inputting information relating to a layout of a mark sheet having thereon a plurality of index cells each containing a document index image corresponding to a document image to be stored in a document storage apparatus, and having thereon a check column on which a user can manually designate storage of the document corresponding to the document index images on the mark sheet;

generating a format in accordance with the input information; and forming the format generated by said generation step on a sheet to form the mark sheet having thereon a plurality of index cells each containing a document index image corresponding to a document image, stored in said storing step, to be stored in the document storage apparatus, and having thereon check columns on which a user can manually select the document index images on the mark sheet, said forming step comprising the steps of reading the document index images stored in said storing step and synthesizing each document index image with an index cell to form a plurality of index cells, each containing a document index image therein.

9. A method according to claim 8, wherein said input step inputs the number of document index images to be recorded on a single mark sheet, and wherein said generating step generates a format in which document index images having a size corresponding to the number of document index images input from said input step are arranged.

10. A method according to claim 8, wherein said input step inputs data relating to the size of the document index images, and wherein said generating step generates a format in which document index images whose number corresponds to the size of the document index images input from said input step are arranged.

11. A method according to claim 8, wherein said input step inputs the number of document index images to be recorded on a single mark sheet, and wherein said generating step generates a format corresponding to the number of document index images input from said input step.

12. A method according to claim 8, further comprising the steps of:

retrieving an image stored in a storage medium; and reading a mark sheet, wherein said retrieving step retrieves the image of a document stored in the storage medium corresponding to a document index image designated by the user by marking a mark in a check column associated with the document index image on the mark sheet read by said reading step.

13. An image recording apparatus, comprising:

reading means for reading document images;

storing means for storing a plurality of document index images and the document images;

input means for inputting information relating to a layout of a mark sheet having thereon a plurality of index cells each containing a document index image corresponding to a document image to be retrieved from said storing means, and having thereon check columns on which a user can manually designate retrieval of the document corresponding to the document index images on the mark sheet;

generation means for generating a format in accordance with information input from said input means; and image forming means for forming the format generated by said generation means on a sheet to form the mark sheet having thereon a plurality of index cells each containing a document index image corresponding to a document image, stored in said storing means, to be retrieved from said storing means, and having thereon check columns on which a user can manually select the document index images on the mark sheet, said image forming means reading the document index from said storing means and synthesizing each document index image with an index cell to form a plurality of index cells each containing a document index image therein.

14. An apparatus according to claim 13, wherein said input means inputs the number of document index images to be recorded on a single mark sheet, and wherein said generation means generates a format in which document index images having a size corresponding to the number of document index images input from said input means are arranged.

15. An apparatus according to claim 13, wherein said input means inputs data relating to the size of the document index images, and wherein said generation means generates a format in which document index images whose number corresponds to the size of the document index images input from said input means are arranged.

16. An apparatus according to claim 13, wherein said input means inputs the number of document index images to be recorded on a single mark sheet, and wherein said generation means generates a format corresponding to the number of document index images input from said input means.

17. An apparatus according to claim 13, further comprising:

retrieval means for retrieving an image stored in a storage medium; and reading means for reading a mark sheet, wherein said retrieval means retrieves the image of a document stored in the storage medium corresponding to a document index image designated by the user by marking a mark in a check column associated with the document index image on the mark sheet read by said reading means.

18. An image recording method comprising the steps of:

reading document images;

storing a plurality of document index images and the read document images;

inputting information relating to a layout of a mark sheet having thereon a plurality of index cells each containing a document index image corresponding to a document image to be retrieved from a document storage apparatus, and having thereon check columns on which a user can manually designate retrieval of the document corresponding to the document index images on the mark sheet;

generating a format in accordance with information input from said inputting step; and forming the format generated by said generating steps on a sheet to form the mark sheet having thereon a plurality of index cells each containing a document index image corresponding to a document image, stored in said storing step, to be retrieved from the document storage apparatus, and having thereon check columns on which a user can manually select the document index images on the mark sheet, said forming step comprising the steps of reading the document index stored in said storing step and synthesizing each document index image with an index cell to form a plurality of index cells each containing a document index image therein.

19. A method according to claim 18, wherein said input step inputs the number of document index images to be recorded on a single mark sheet, and wherein said generating step generates a format in which document index images having a size corresponding to the number of document index images input from said input step are arranged.

20. A method according to claim 18, wherein said input step inputs data relating to the size of the document index images, and wherein said generating step generates a format in which document index images whose number corresponds to the size of the document index images input from said input step are arranged.

21. A method according to claim 18, wherein said input step inputs the number of document index images to be recorded on a single mark sheet, and wherein said generating step generates a format corresponding to the number of document index images input from said input step.

22. A method according to claim 18, further comprising the steps of:

retrieving an image stored in a storage medium; and reading a mark sheet, wherein said retrieving step retrieves the image of a document stored in the storage medium corresponding to a document index image designated by the user by marking a mark in a check column associated with the document index image on the mark sheet read by said reading step.

23. An image recording apparatus for forming a mark sheet on which a user can manually designate a document to be stored or retrieved, a storage operation, and a retrieval operation, comprising:

input means for inputting information relating to a layout of a mark sheet having thereon a plurality of index cells each containing a document index image corresponding to a document image to be retrieved from or stored in a document storage apparatus, and having thereon a first check column on which a user can manually designate storage of a document whose corresponding index image is checked, a second check column on which a user can manually designate retrieval of a document whose corresponding index image is checked, and a plurality of check columns on which a user can manually designate a document to be retrieved or stored, each check column being positioned adjacent a different index cell;

generation means for generating a format in accordance with information input from said input means; and means for storing the plurality of document index images and document images;

image forming means for forming the format generated by said generation means on a sheet to form the mark sheet having thereon a plurality of index cells each containing a document index image corresponding to a document image, stored in said storing means, to be retrieved from or stored in a document storage apparatus, and having thereon a first check column on which a user can manually designate storage of a document whose corresponding index image is checked, a second check column on which a user can manually designate retrieval of a document whose corresponding index image is checked, and a plurality of check columns on which a user can manually designate a document to be retrieved or stored, each check column being positioned adjacent a different index cell, said image forming means reading the document index from said storing means and synthesizing each document index image with an index cell to form a plurality of index cells each containing a document index image therein.

24. A mark-sheet recording method for forming a mark sheet on which a user can manually designate a document to be stored or retrieved, a storage operation, and a retrieval operation, comprising the steps of:

inputting information relating to a layout of a mark sheet having thereon a plurality of index cells each containing a document index image corresponding to a document image to be retrieved from or stored in a document storage apparatus, and having thereon a first check column on which a user can manually designate storage of a document whose corresponding index image is checked, a second check column on which a user can manually designate retrieval of a document whose corresponding index image is checked, and a plurality of check columns on which a user can manually designate a document to be retrieved or stored, each check column being positioned adjacent a different index cell;

generating a format in accordance with the input information;

storing the plurality of document index images and document images; and forming the generated format on a sheet to form a mark sheet having thereon a plurality of index cells each containing a document index image corresponding to a document image, stored in said storing step, to be retrieved from or stored in a document storage apparatus, and having thereon a first check column on which a user can manually designate storage of a document whose corresponding index image is checked, a second check column on which a user can manually designate retrieval of a document whose corresponding index image is checked, and a plurality of check columns on which a user can manually designate a document to be retrieved or stored, each check column being positioned adjacent a different index cell, said forming step comprising the steps of reading the document index images stored in said storing step and synthesizing each document index image with an index cell to form a plurality of index cells, each containing a document index image therein.

25. An image storing apparatus, comprising:

storing means for storing a plurality of document images in a storage medium;

input means for inputting an indication relating to a layout of an index image sheet having thereon a plurality of index images, each of which corresponds to a representation of each of document images to be retrieved from said storage medium, wherein the indication includes a direction to vary any one of (i) the document images retrieved from the storage medium and represented as an index image on the index image sheet, (ii) the number of the index images on the image sheet, and (iii) the size of the index images on the image sheet;

generation means for generating an image in which the index images of the number or the size in accordance with the indication input from said input means are arranged; and outputting means for outputting the image generated by said generation means to an image recording apparatus to form the index image sheet having thereon a plurality of index images, each of which corresponds to a representation of each of document images to be retrieved from the storage medium.

26. An apparatus according to claim 25, wherein said index image is an image of a first page of said document image.

27. An image storing apparatus, comprising:

storing means for storing a plurality of document index images and document images in a storage medium;

input means for inputting an indication relating to a layout of a mark sheet having thereon a plurality of index cells, each containing a document index image corresponding to a document image to be retrieved from said storage medium, and having thereon check columns on which a user can manually designate retrieval of the document corresponding to the document index images on the mark sheet;

generating means for generating a format image in accordance with the indication input from said input means;

outputting means for outputting the format image generated by said generation means to an image recording apparatus to form the mark sheet having thereon a plurality of index cells each containing a document index image corresponding to a document image, stored in said storing means, to be retrieved from the storage medium, and having thereon check columns on which a user can manually select the document index images on the mark sheet, said image forming means reading the document index images from the storage medium and synthesizing each document index image with an index cell to form a plurality of index cells each containing a document index image therein, and discrimination means for discriminating the selected document index image by discriminating the check column on which the user made a mark on the basis of the mark sheet read by an image reading apparatus.

28. A mark-sheet storing method, comprising the steps of:

storing a plurality of document images in a storage medium;

inputting an indication relating to a layout of an index image sheet having thereon a plurality of index images, each of which corresponds to a representation of each of document images to be retrieved from the storage medium, wherein the indication includes a direction to vary any one of (i) the document images retrieved from the storage medium and represented as an index image on the index image sheet, (ii) the number of the index images on the image sheet, and (iii) the size of the index images on the image sheet;

generating an image in which the index images of the number or the size in accordance with the indication input from said input step are arranged; and outputting the image generated by said generation step to an image recording apparatus to form the index image sheet having thereon a plurality of index images, each of which corresponds to a representation of each of document images to be retrieved from the storage medium.

29. A method according to claim 28, wherein said index image is an image of a first page of said document image.

30. A mark-sheet storing method, comprising:

storing a plurality of document index images and document images in a storage medium;

inputting an indication relating to a layout of a mark sheet having thereon a plurality of index cells, each containing a document index image corresponding to a document image to be retrieved from the storage medium, and having thereon check columns on which a user can manually designate retrieval of the document corresponding to the document index images on the mark sheet;

generating a format image in accordance with the indication input from said input step; and outputting the format image generated by said generation step to an image recording apparatus to form the mark sheet having thereon a plurality of index cells each containing a document index image corresponding to a document image, stored in said storing step, to be retrieved from the storage medium, and having thereon check columns on which a user can manually select the document index images on the mark sheet, said outputting step comprising the steps of reading the document index images stored in the storage medium and synthesizing each document index image with an index cell to form a plurality of index cells each containing a document index image therein, and discriminating the selected document index image by discriminating the check column on which the user made a mark on the basis of the mark sheet read by an image reading apparatus.

* * * * *